United States Patent
Jett, II et al.

(10) Patent No.: US 10,207,417 B2
(45) Date of Patent: Feb. 19, 2019

(54) SERVO-DRIVEN CUTTING MECHANISM FOR DRIVING A MULTI-DIRECTIONAL CUTTING EDGE

(71) Applicant: Baker Perkins Inc., Grand Rapids, MI (US)

(72) Inventors: James E. Jett, II, Lamont, MI (US); William Wierenga, N. Muskegon, MI (US)

(73) Assignee: Baker Perkins Inc., Grand Rapids, MI (US)

( * ) Notice: Subject to any disclaimer, the term of this patent is extended or adjusted under 35 U.S.C. 154(b) by 471 days.

(21) Appl. No.: 14/996,585

(22) Filed: Jan. 15, 2016

(65) Prior Publication Data

US 2017/0203455 A1 Jul. 20, 2017

(51) Int. Cl.
| | |
|---|---|
| *B26D 1/45* | (2006.01) |
| *B26D 1/06* | (2006.01) |
| *B26D 1/08* | (2006.01) |
| *A21C 5/00* | (2006.01) |
| *A21C 9/08* | (2006.01) |

(52) U.S. Cl.
CPC ............... *B26D 1/45* (2013.01); *A21C 5/00* (2013.01); *A21C 5/003* (2013.01); *A21C 9/08* (2013.01); *B26D 1/06* (2013.01); *B26D 1/08* (2013.01); *B26D 2210/02* (2013.01)

(58) Field of Classification Search
CPC .. A21C 5/00; A21C 5/003; B26D 1/06; B26D 1/08; B26D 1/45
See application file for complete search history.

(56) References Cited

U.S. PATENT DOCUMENTS

2011/0226102 A1* 9/2011 Biggel .................. A01J 27/04
83/23

FOREIGN PATENT DOCUMENTS

CA 2940743 A1 * 9/2015 ............... B26D 1/08

OTHER PUBLICATIONS

Haas Food Equipment GMBH, http://www.haas.com/en/equipment/biscuit-plants-14/dough-piece-preparation-equipment-24/v60-389/, web page printed Jan. 15, 2016.
Haas Food Equipment GMBH, http://www.haas.com/en/news/archive/exhibition-preview-ibie-2010-270/, web page dated Sep. 10, 2010.
(Continued)

*Primary Examiner* — Timothy Kennedy
(74) *Attorney, Agent, or Firm* — Price Heneveld LLP

(57) ABSTRACT

A cutting assembly for cutting an extruded edible material includes an extrusion assembly having a food extrusion port that extrudes an edible material in an extrusion direction. A cutter frame having a cutting edge is positioned proximate the food extrusion port. The cutting edge moves through a cutting region proximate the extrusion port in a cutting motion. First and second servo motors are operably coupled to the cutter frame, wherein the first servo motor operates the cutting edge to define a first component of the cutting motion perpendicular to the extrusion direction. The second servo motor operates the cutting edge to define a second component of the cutting motion generally parallel with the extrusion direction. The first and second servo motors combine the first and second components to define a cutting path and a return path of the cutting edge through the cutting region.

11 Claims, 18 Drawing Sheets

(56) References Cited

OTHER PUBLICATIONS

Imaforni Int'l S.P.A., http://www.imaforni.com/equipment/forming.php?codice_label=wirecut&briciola=Wirecut and soft center, web page printed Jan. 15, 2016.
Imaforni Int'l S.P.A., http://www.imaforni.com/equipment/forming.php?codice_label=depositor&briciola=Depositor%20and%20wirecut, web page printed Jan. 15, 2016.
Egan Food Technologies, http://www.eganfoodtech.com/#!depositors-machines/csm7, web page printed Jan. 15, 2016.

* cited by examiner

SERVO-DRIVEN CUTTING MECHANISM FOR DRIVING A MULTI-DIRECTIONAL CUTTING EDGE

BACKGROUND

The device is in the field of cutting mechanisms for extruded food products, and more specifically, a cutting mechanism for extruded food products having a servo-driven multi-directional cutting edge.

SUMMARY

In at least one aspect, a cutting assembly for cutting an extruded edible material includes an extrusion assembly having at least one food extrusion port. The extrusion assembly is configured to extrude an edible material through the at least one food extrusion port in an extrusion direction. A cutting region is defined proximate the food extrusion port, wherein the extrusion assembly is configured to selectively extrude the edible material in the extrusion direction and through the cutting region. A cutter frame having a lateral cutting edge is positioned proximate an output aperture of the at least one food extrusion port, wherein the lateral cutting edge is positioned relative to the extrusion assembly to selectively move through the cutting region in a cutting motion. First and second servo motors are operably coupled to the cutter frame. The first servo motor operates the cutting edge to define a first component of the cutting motion, wherein the first component is generally perpendicular to the extrusion direction. The second servo motor operates the cutting edge to define a second component of the cutting motion, wherein the second component is generally parallel with the extrusion direction. The first and second servo motors combine the first and second components of the cutting motion to define a cutting path of the cutting edge through the cutting region and a return path through the cutting region.

In at least another aspect, a cutting mechanism for cutting an extruded edible material includes a cutter frame having a lateral cutting edge, wherein the cutter frame has first and second ends. A first servo motor is operably engaged to at least one of the first and second ends of the cutter frame, wherein the first servo motor laterally operates the cutting edge through a cutting region. A second servo motor is operably engaged to the second end of the cutter frame, wherein the second servo motor vertically operates the cutting edge proximate the cutting region.

In at least another aspect, a cutting mechanism for a food extruding assembly includes a cutter frame having a lateral cutting edge and positioned proximate an extrusion port, wherein the lateral cutting edge is positioned relative to the extrusion port to selectively extend through a cutting region in a cutting motion. First and second servo motors are operably coupled to the cutter frame, wherein the first servo motor operates the cutting edge to define a first component of the cutting motion, and wherein the second servo motor operates the cutting edge to define a second component of the cutting motion. The first component is a motion of the cutting edge about a first rotational axis and the second component is a motion of the cutting edge about a second rotational axis. The second rotational axis moves in conjunction with the first component, and the first and second servo motors cooperatively combine the first and second components to define a cutting path of the cutting edge through the cutting region and a return path through the cutting region, the cutting region being positioned proximate the extrusion port.

These and other features, advantages, and objects of the present device will be further understood and appreciated by those skilled in the art upon studying the following specification, claims, and appended drawings.

DETAILED DESCRIPTION OF EMBODIMENTS

Figure 1:
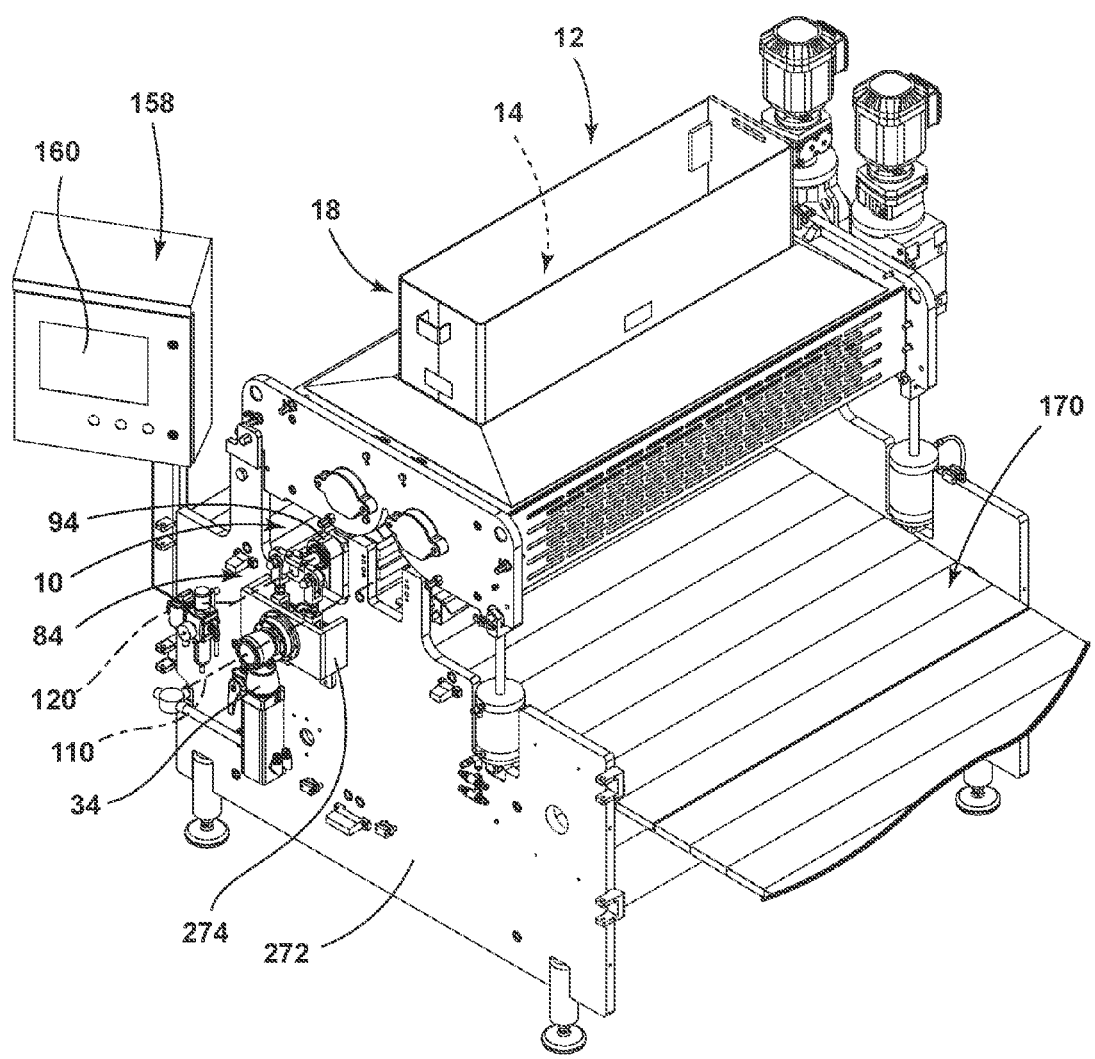
FIG. 1 is a top perspective view of a food cutting assembly incorporating an aspect of the servo-driven cutting mechanism.
Figure 2:
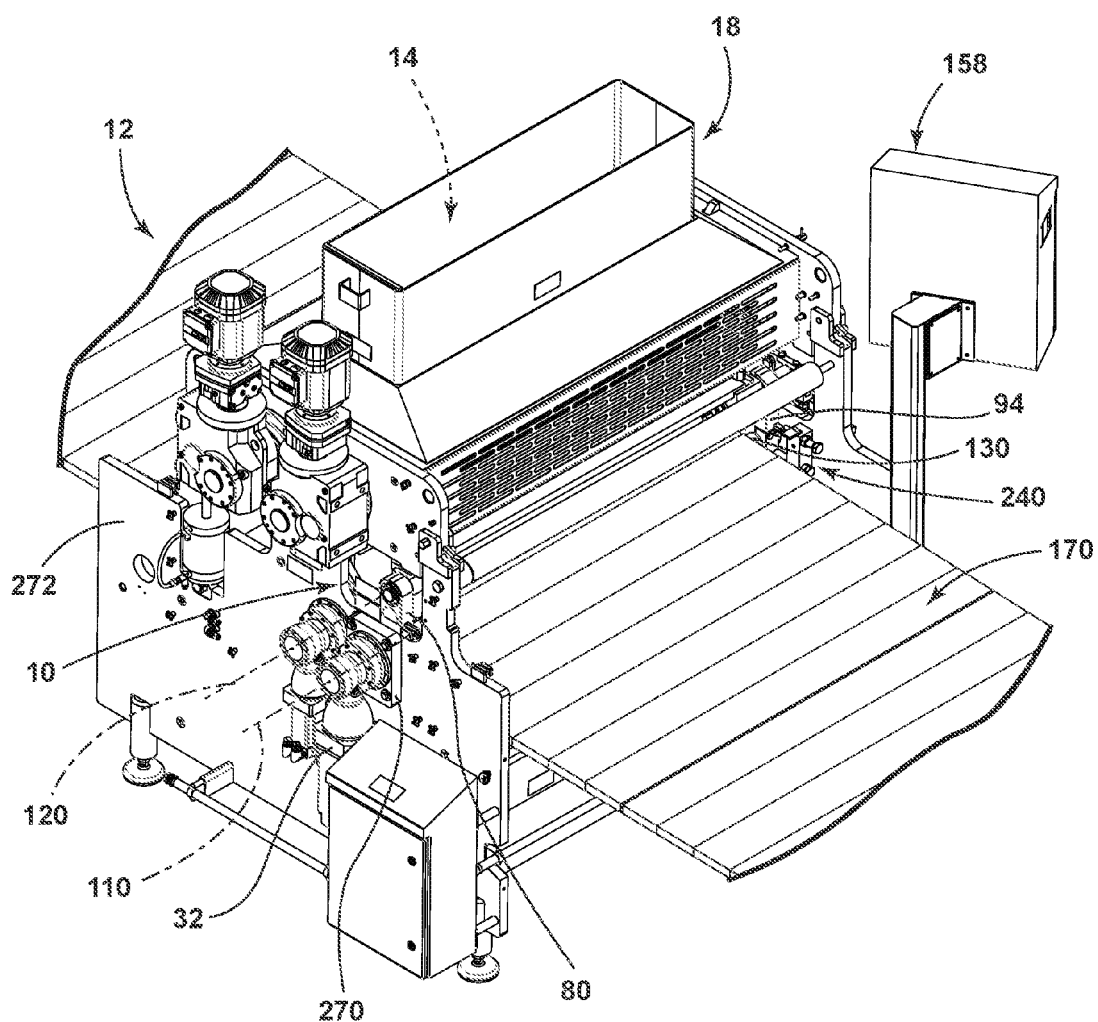
FIG. 2 is an alternate top perspective view of the cutting assembly of FIG. 1.
Figure 3:
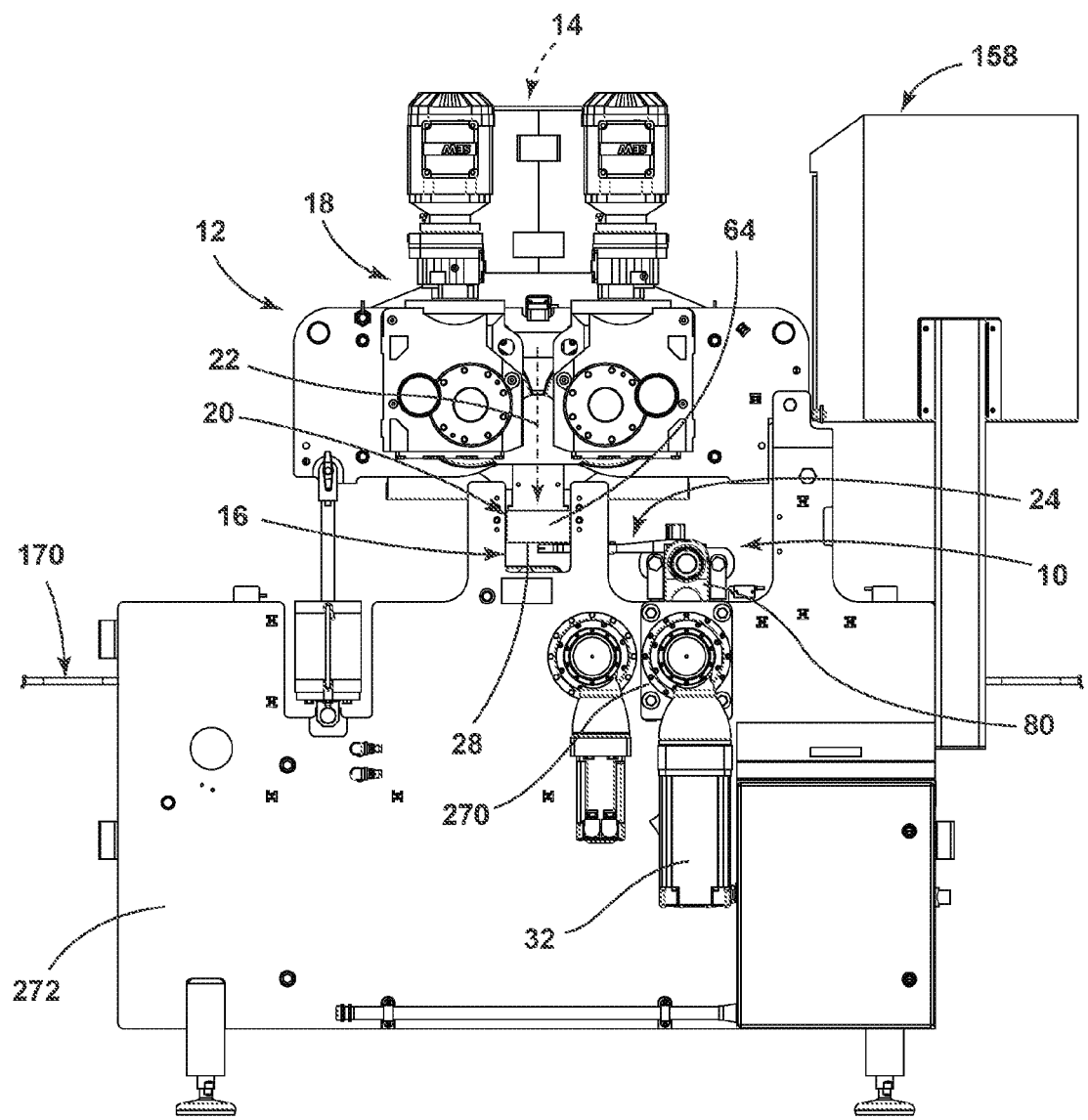
FIG. 3 is a first side perspective view of the cutting assembly of FIG. 1.
Figure 4:
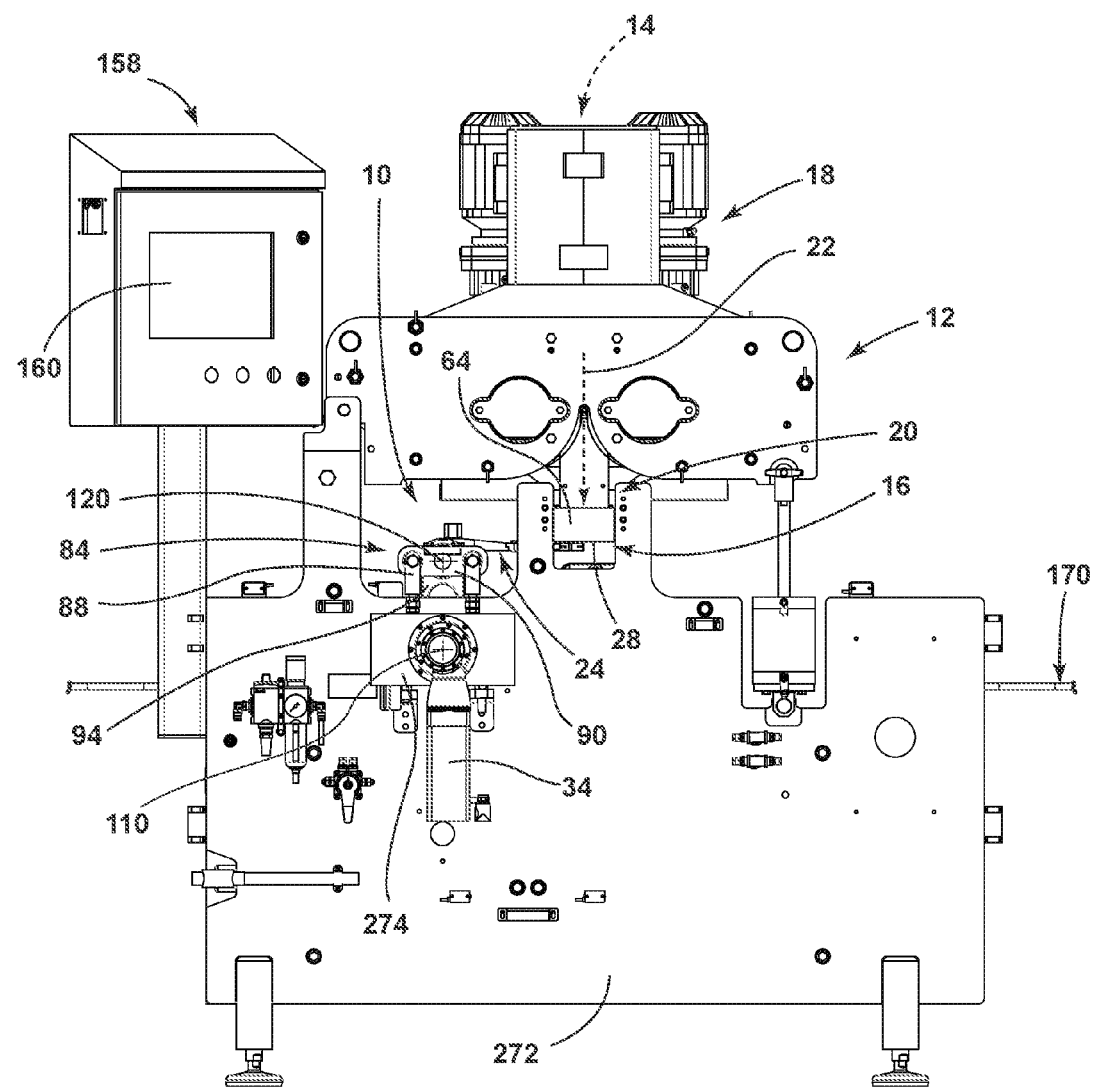
FIG. 4 is a second side elevational view of the cutting assembly of FIG. 1.
Figure 5:
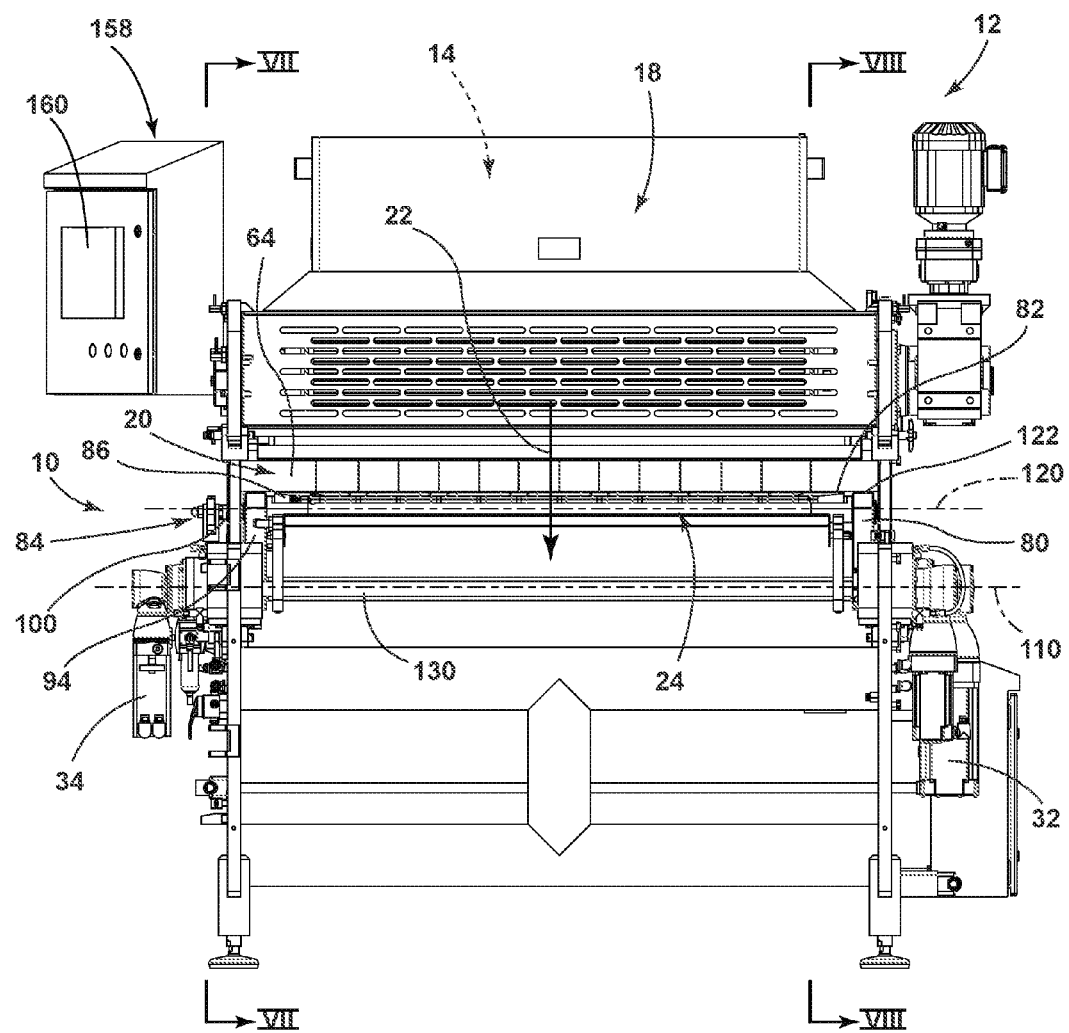
FIG. 5 is a third side elevational view of the cutting assembly of FIG. 1 with the conveyor removed.
Figure 6:
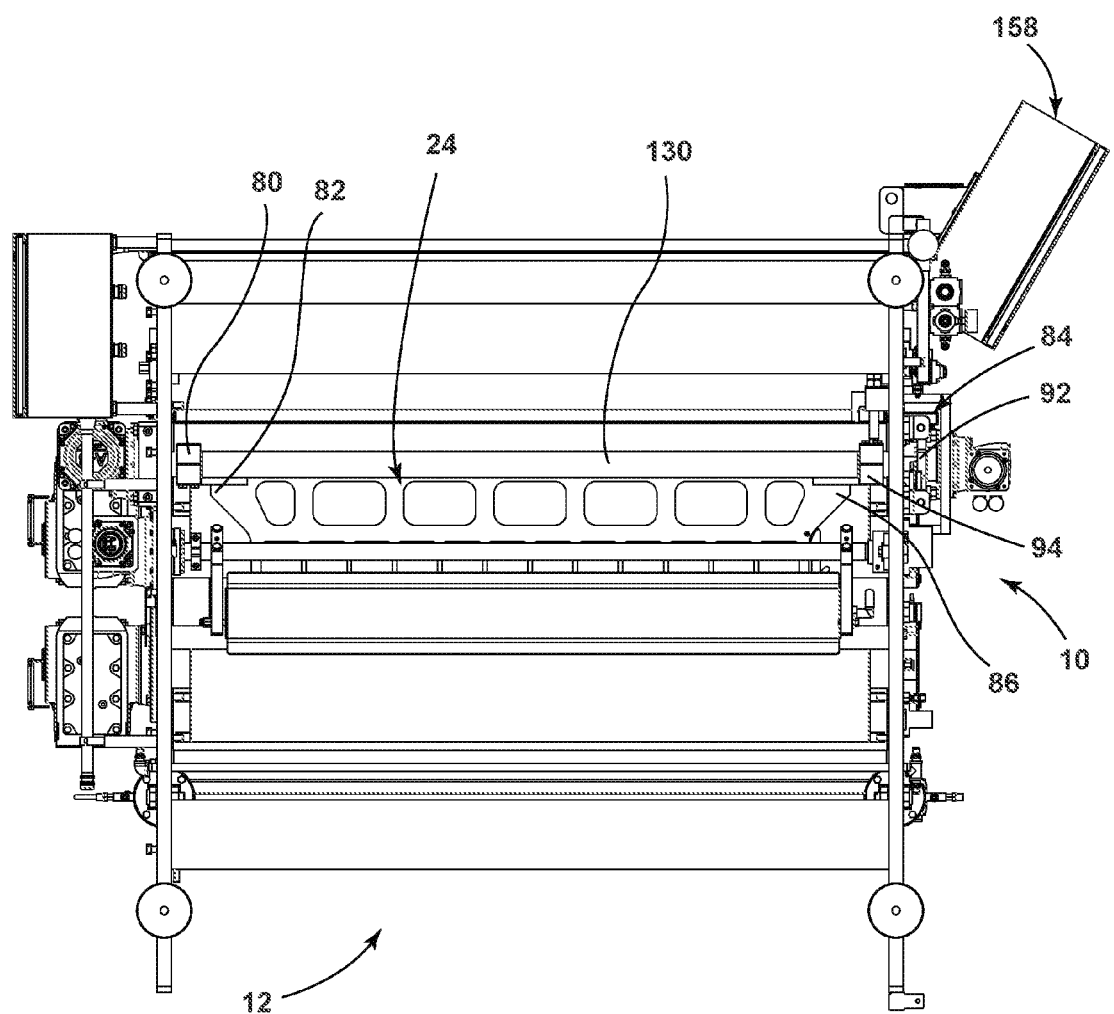
FIG. 6 is a bottom plan view of the cutting assembly of FIG. 5.
Figure 7:
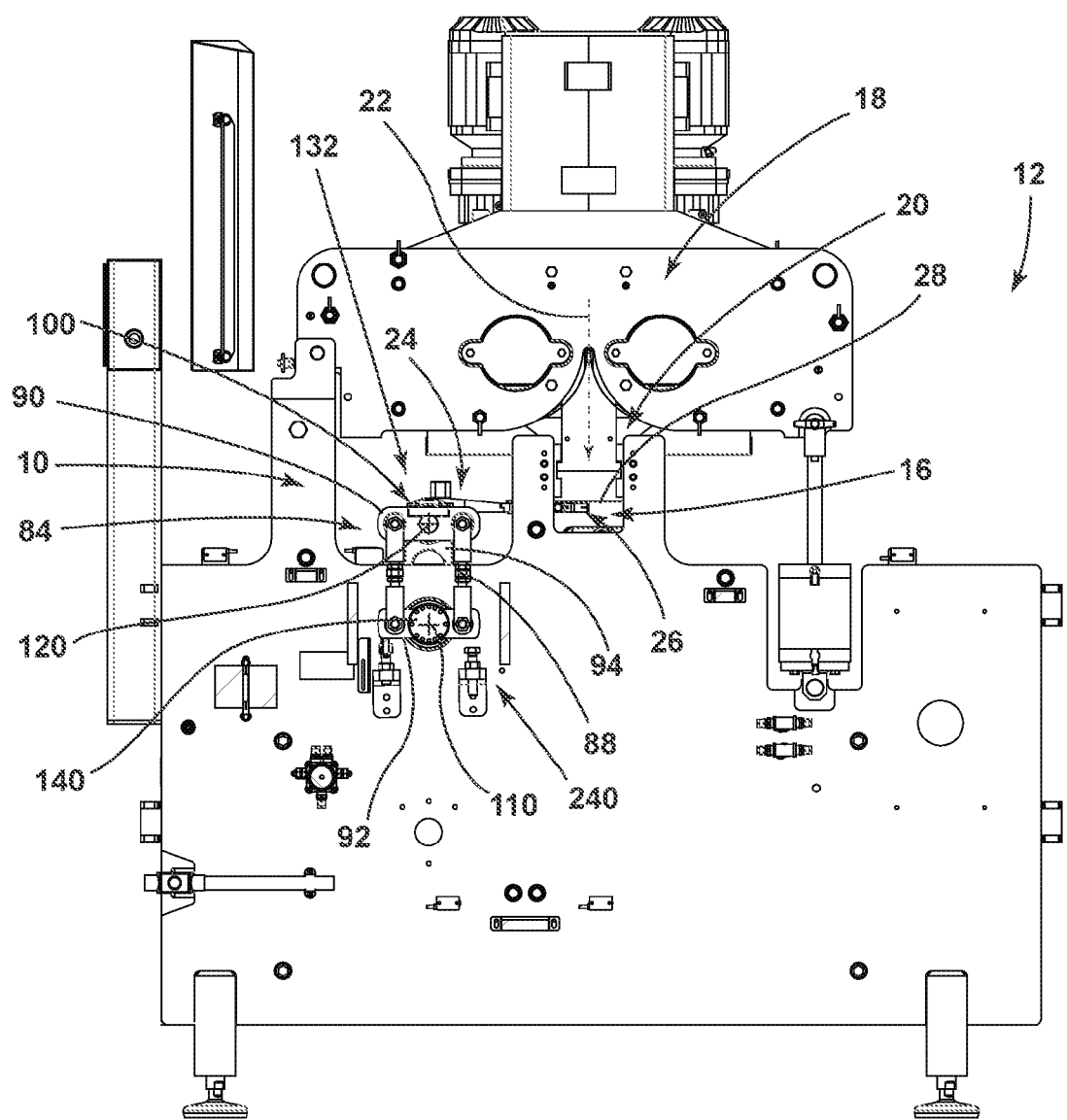
FIG. 7 is a cross-sectional view of the cutting assembly of FIG. 5 taken along line VII-VII.
Figure 8:
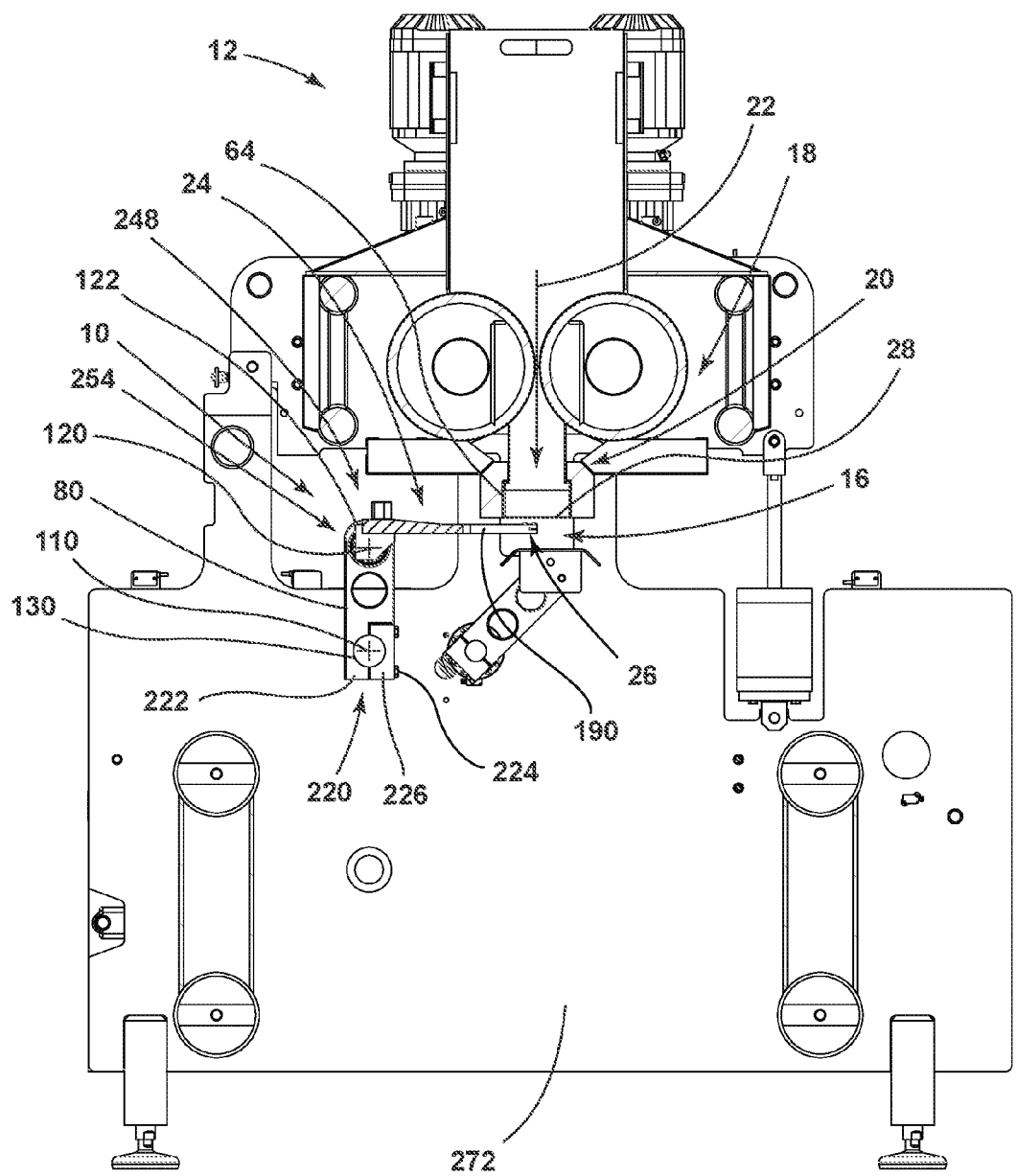
FIG. 8 is a cross-sectional view of the cutting assembly of FIG. 5 taken along line VIII-VIII.
Figure 9:
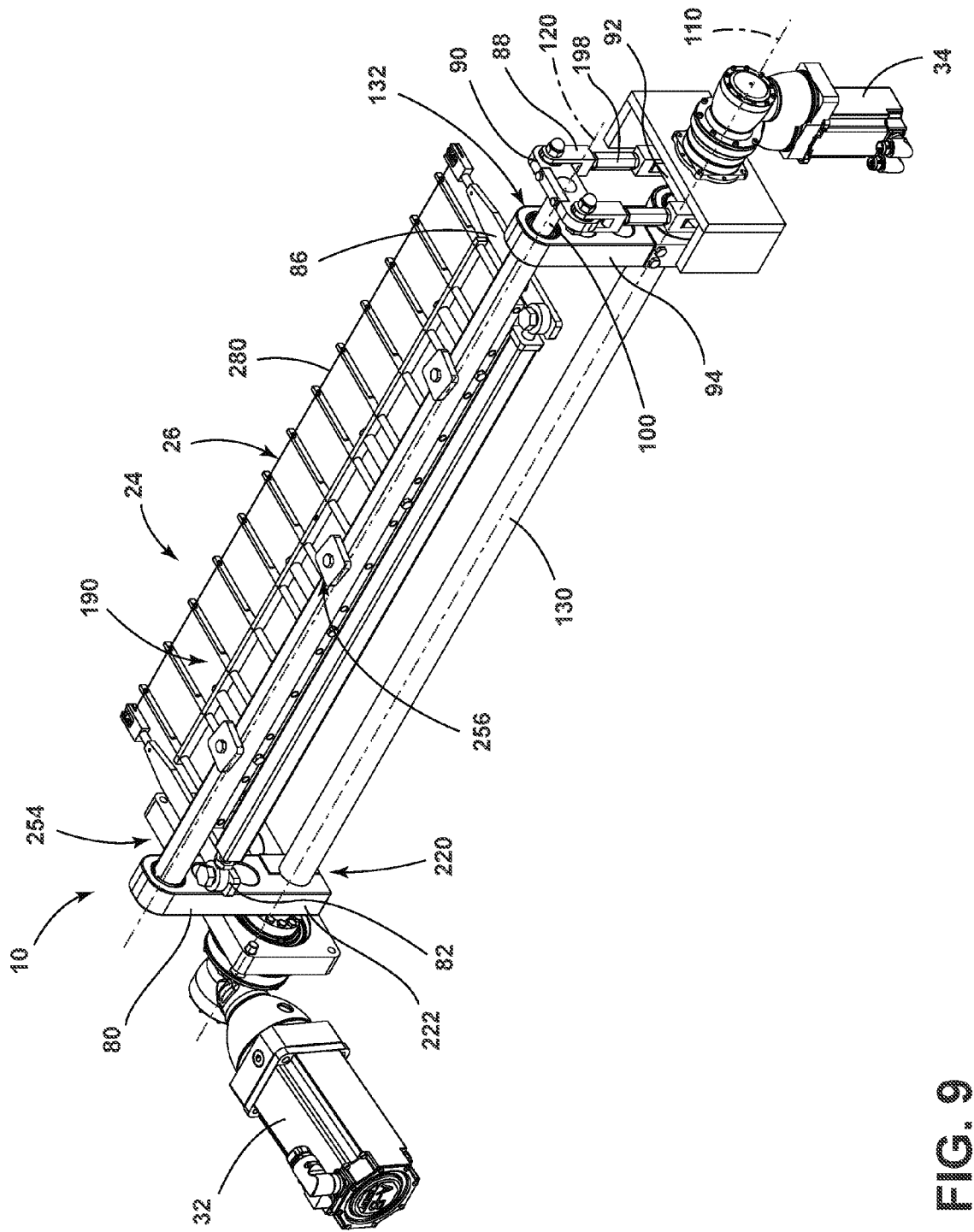
FIG. 9 is a top perspective view of an aspect of the servo-driven cutting mechanism.
Figure 10:
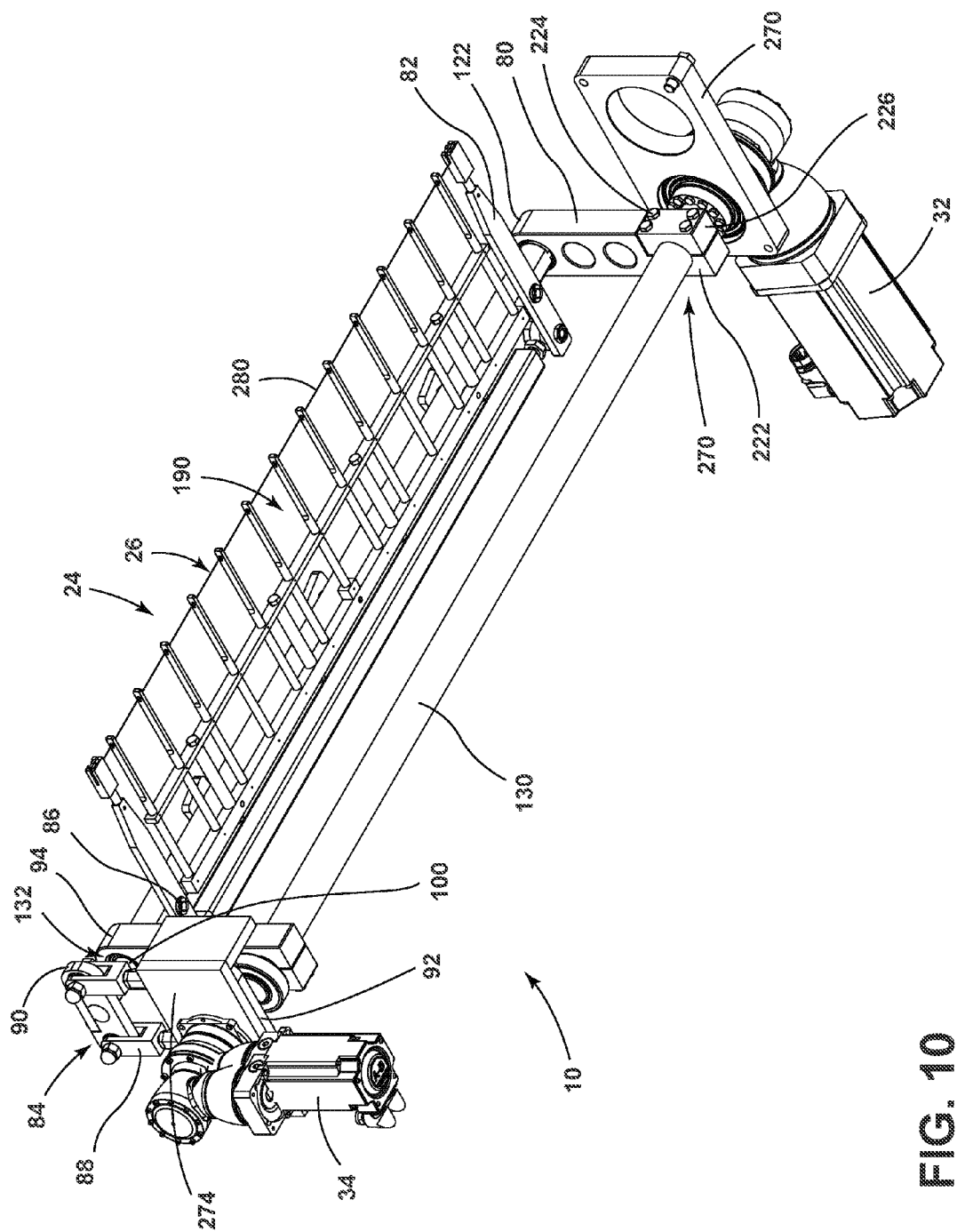
FIG. 10 is a bottom perspective view of the servo-driven cutting mechanism of FIG. 9.
Figure 11:
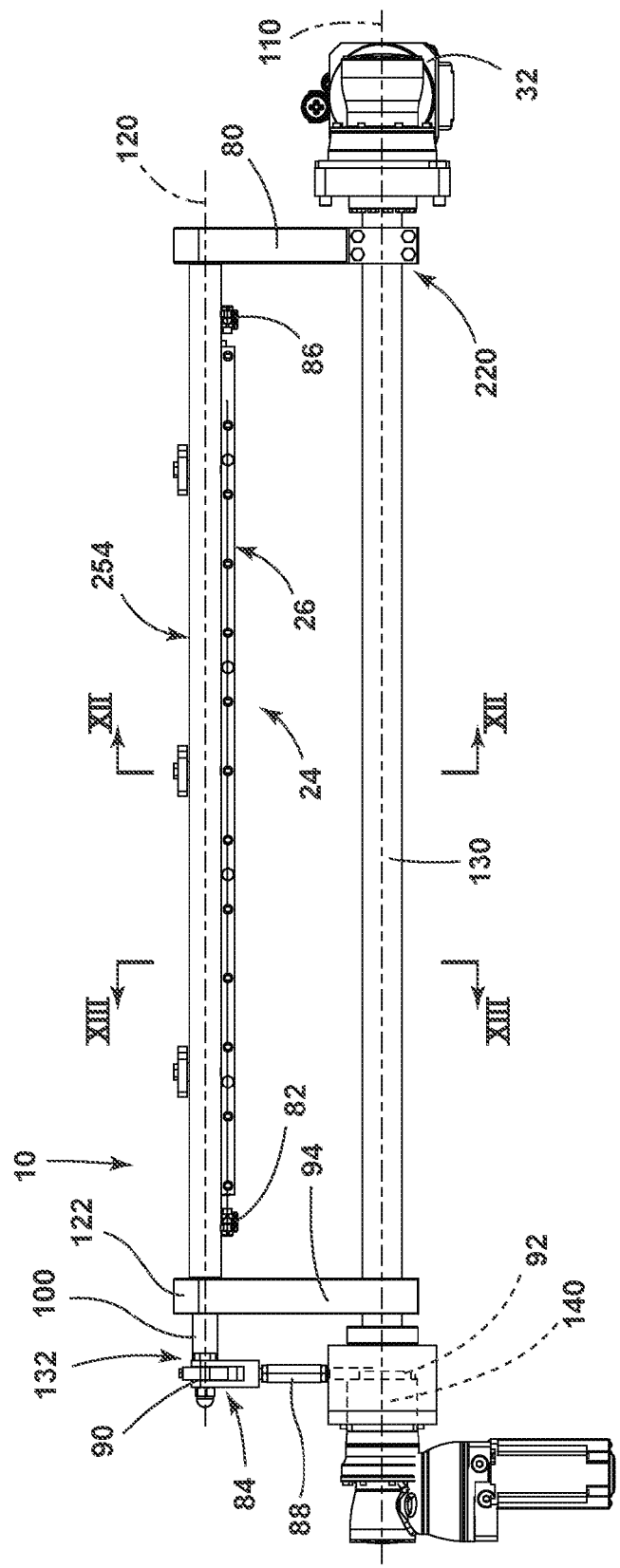
FIG. 11 is a first side elevational view of the cutting mechanism of FIG. 9.
Figure 12:
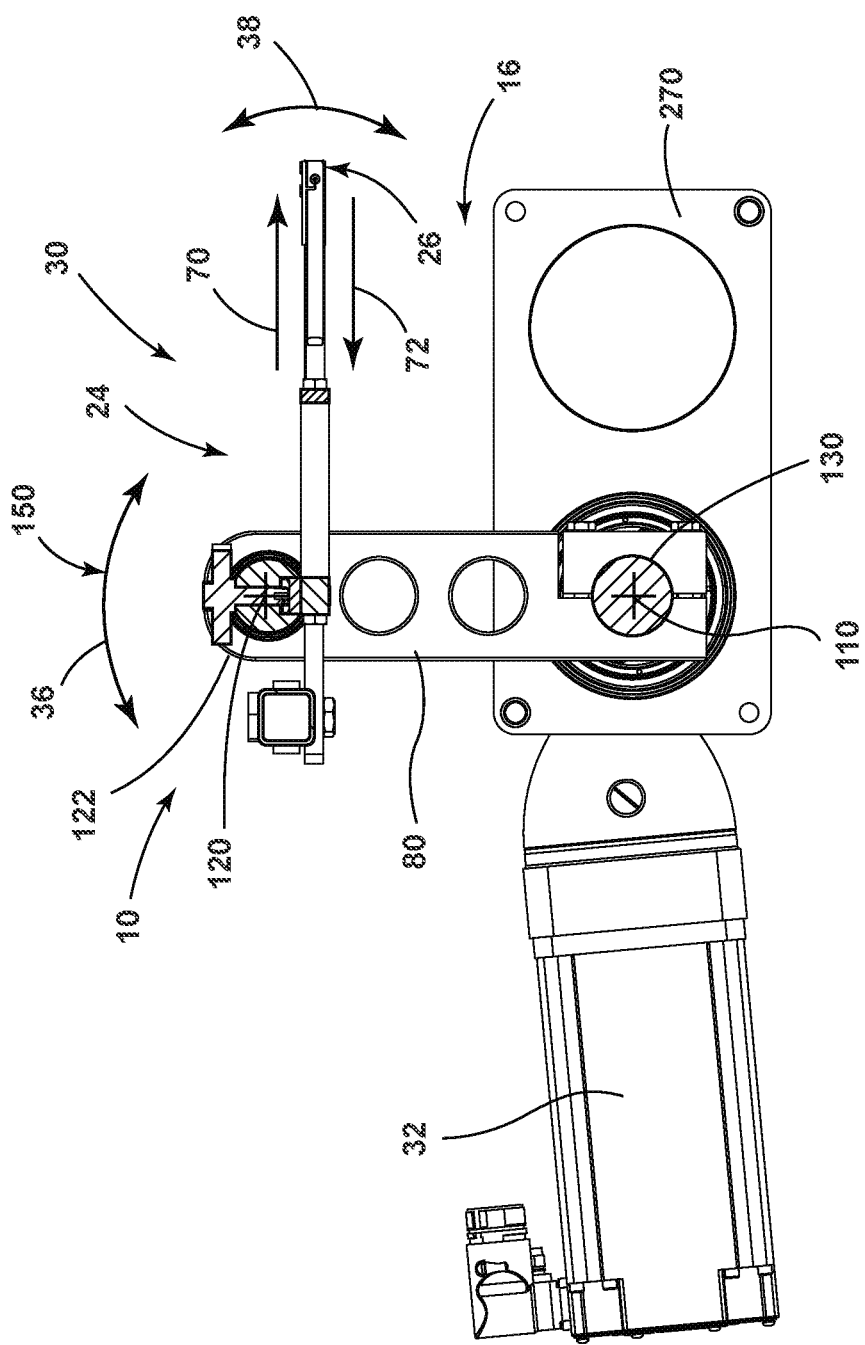
FIG. 12 is a cross-sectional view of the servo-driven cutting mechanism of FIG. 11 taken along line XII-XII.
Figure 13:
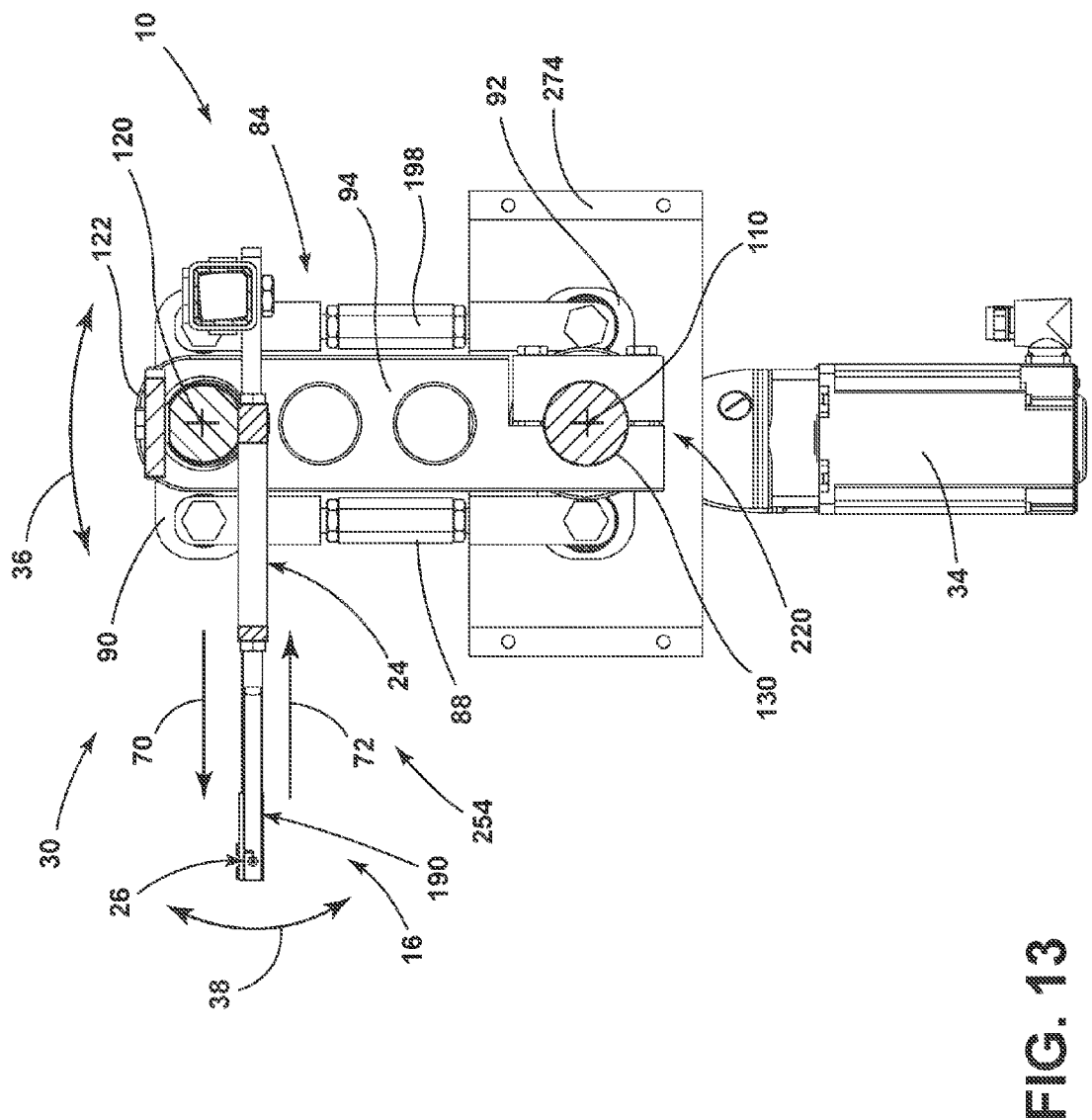
FIG. 13 is a cross-sectional view of the servo-driven cutting mechanism of FIG. 11 taken along line XIII-XIII.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-16, reference numeral 10 generally refers to a servo-driven cutting mechanism incorporated within a cutting assembly 12 for cutting an extruded edible material 14 and/or food product that is extruded through a cutting region 16. The cutting assembly 12 includes an extrusion assembly 18 having at least one food extrusion port 20. The extrusion assembly 18 is configured to extrude an edible material 14 and/or other food product through the at least one food extrusion port 20 in an extrusion direction 22, typically a generally downward direction, and through a cutting region 16 of the cutting assembly 12. The cutting region 16 is defined proximate the food extrusion port 20, wherein the extrusion assembly 18 is configured to selectively extrude the edible material 14 in the extrusion direction 22 and through the cutting region 16. The cutter frame 24, having a lateral cutting edge 26, is positioned proximate an output aperture 28 of the at least one food extrusion port 20. The lateral cutting edge 26 is positioned relative to the extrusion assembly 18 to selectively move through the cutting region 16 in the cutting motion 30. First and second servo motors 32, 34 are operably coupled to the cutter frame 24. The first servo motor 32 operates the cutting edge 26 of the cutter frame 24 to define a first component 36 of the cutting motion 30. The first component 36 of the cutting motion 30 is generally perpendicular to the extrusion direction 22. The second servo motor 34 operates the cutting edge 26 of the cutter frame 24 to define a second component 38 of the cutting motion 30. Typically, the second component 38 of the cutting motion 30 is generally parallel with the extrusion direction 22. The first and second servo motors 32, 34 combine the first and second components 36, 38 of the cutting motion 30 to define cutting path 40 of the cutting edge 26 through the cutting region 16 and a return path 42 through the cutting region 16 in an opposing direction.

Figure 14:
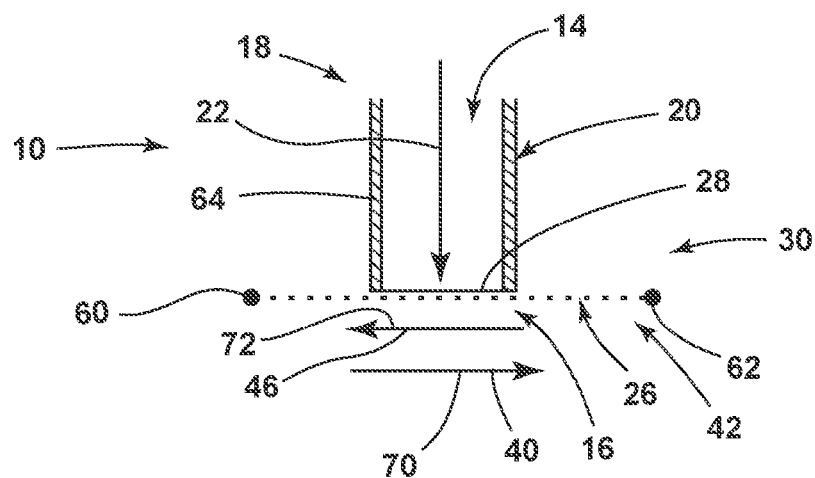
FIG. 14 is a schematic diagram illustrating an aspect of the cutting motion incorporating a return cutting path.
Figure 15:
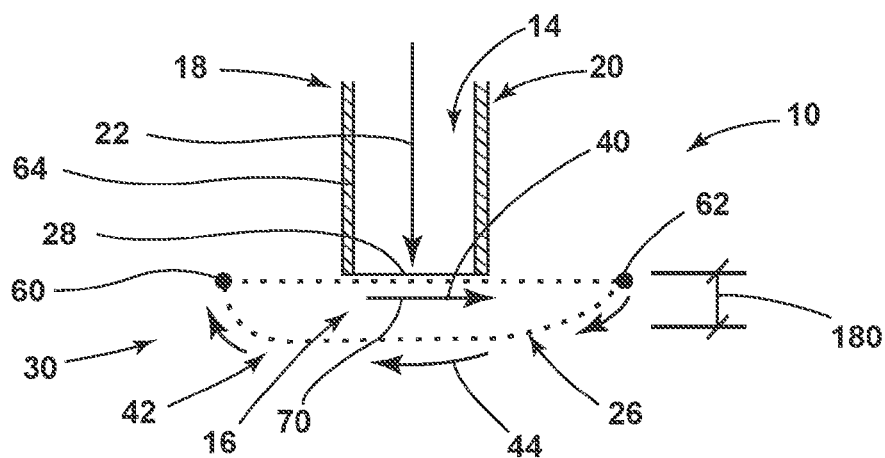
FIG. 15 is a schematic diagram illustrating an aspect of the cutting motion incorporating an arcuate return path.
Figure 16:
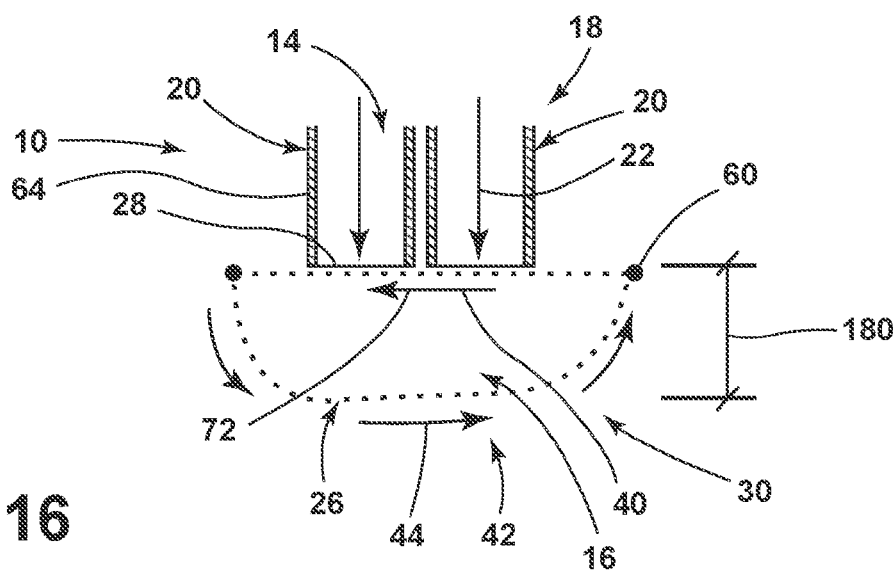
FIG. 16 is a schematic diagram illustrating an aspect of the cutting motion incorporating a cutting path in the rearward direction and an arcuate return path in the forward direction.
Figure 17:
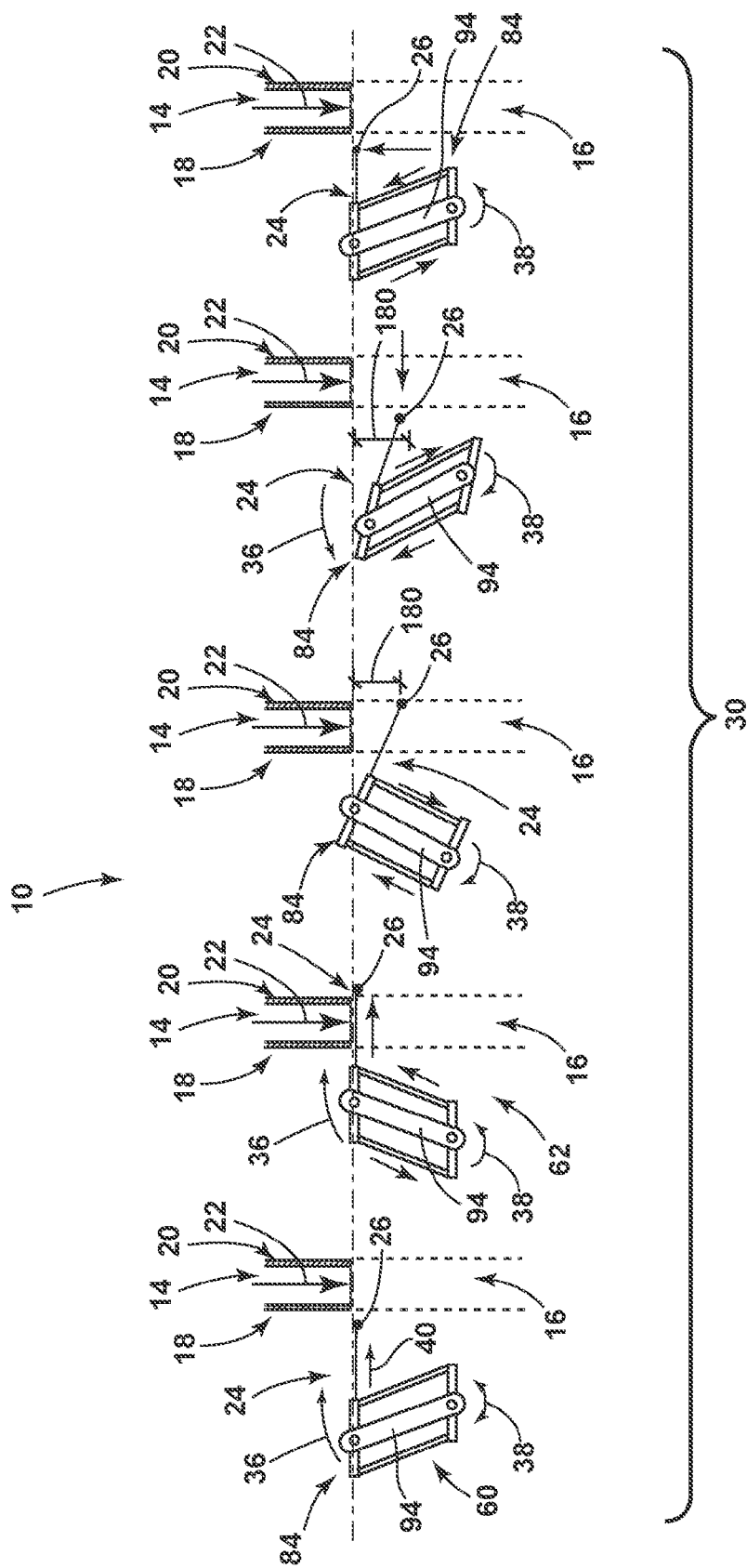
FIG. 17 is a schematic diagram illustrating an aspect of a progression of a cycle of a cutting motion of the cutting edge through the cutting region.

As exemplified in FIGS. 14-16, it is contemplated that the return path 42 of the cutting edge 26 can be selectively adjusted to selectively and alternatively define one of an arcuate return path 44 through the cutting region 16 and a return cutting path 46 through the cutting region 16. It is also contemplated that the cutting path 40 can be a linear or arcuate movement pattern of the cutting edge 26 through the extruded edible material 14 and the cutting region 16. The cutting path 40 and the return path 42 can each be selectively and independently adjusted to define a plurality of cutting paths 40 that can be used in combination with a plurality of return paths 42. In this manner, potentially infinite combinations of cutting paths 40 and return paths 42 can be implemented to define the plurality of cutting motions 30.

Referring now to FIGS. 9-17, it is contemplated that the cutting path 40 can be defined by the cutting edge 26 extending linearly from a start position 60 of the cutting edge 26 to an end position 62 of the cutting edge 26. While defining the cutting path 40, the cutting edge 26 can be configured to at least partially engage the at least one extrusion port 20. Accordingly, the cutting edge 26 can slidably engage a portion of the output aperture 28 of the extrusion port 20. In this manner, as the cutting edge 26 moves through the extruded edible material 14, a substantially clean cut through the edible material 14 occurs as the cutting edge 26 moves through the extruded edible material 14. It is also contemplated that the cutting edge 26 can be free of contact or substantially free of contact with the output aperture 28 during performance of the cutting path 40. Additionally, the sidewalls 64 of the food extrusion port 20 also serve to minimize the deflection of the extruded edible material 14 as it leaves the output aperture 28 of a food extrusion port 20 and is passed through by the cutting edge 26. In this manner, the extruded edible material 14 can be maintained in a particular shape that corresponds to the shape of the output aperture 28 during formation of the cut portions of the extruded edible material 14.

It is contemplated that the shape of the extruded edible material 14 can be substantially in any geometric shape that includes, but is not limited to, round, oval, star-shaped, irregularly shaped, shaped according to the silhouette of most any object, animal, toy, or other similar shape. It is contemplated that the extruded edible material 14 can include materials edible, chewable, or otherwise consumable by humans and/or animals. Such edible material 14 can include, but is not limited to, cookies, chips, baked goods, pet food, pet treats, and other consumable extruded substances. Additionally, while the term "edible" is used to describe the extruded edible material 14, it is contemplated that inedible materials or materials not intended for consumption can be extruded and portioned using aspects of the servo-driven cutting mechanism 10.

Referring again to FIGS. 9-14, where the return path 42 is defined by the return cutting path 46, the cutting edge 26 will operate in a generally linear direction from the end position 62 back to the start position 60, such that the cutting edge 26 can be used to cut the extruded edible material 14 in opposing first and second directions, such as upward and downward directions or forward and rearward directions 70, 72. Accordingly, it is contemplated that in such an embodiment, the extruded edible material 14 can be extruded at a higher rate of speed. The greater rate of extrusion can be accommodated, as one cycle of the cutting motion 30 includes two separate cutting operations of the extruded edible material 14 in the form of the cutting path 40 and the return cutting path 46. Further details of the aspects of the cutting motion 30 will be described in greater detail below.

Referring again to the various embodiments as exemplified in FIGS. 9-13 and 15-17, where the return path 42 is defined by the arcuate return path 44, the cutting edge 26 is configured to operate from the end position 62 back to the start position 60, but in a generally non-linear motion. Where the arcuate return path 44 is utilized, the cutting edge 26 is moved distal from the at least one extrusion port 20 such that the cutting edge 26 is out of engagement with the output aperture 28. Accordingly, the cutting edge 26 is moved downward and, in some embodiments, simultaneously back toward the starting position. The cutting edge 26 is then moved back upward and into the start position 60 so that the cutting path 40 can be initiated once again to start another cycle of the cutting motion 30.

According to the various embodiments, as exemplified in FIGS. 9-17, during operation of the cutting motion 30 that can include the cutting path 40 and the arcuate return path 44, the extruded edible material 14 is continuously extruded. Through the use of the arcuate return path 44, the cutting edge 26 can be moved outward from the food extrusion port 20 so that the cutting edge 26 is free of engagement with the continuously extruded edible material 14. In such an embodiment, it is contemplated that each cycle of the cutting motion 30 includes a single cutting operation in the form of a cutting path 40 through the cutting region 16. The configuration of the cutting motion 30 that includes the cutting path 40 and one of the arcuate return path 44 or the return cutting path 46 and the adjustability of this cutting motion 30 will be described in greater detail below.

Referring again to FIGS. 9-17, according to the various embodiments, a first swing arm 80 can extend from the first servo motor 32 to a first end 82 of the cutter frame 24. The first swing arm 80 transfers motion from the first servo motor 32 to the cutter frame 24 to define the first component 36 of the cutting motion 30. Additionally, a rotating assembly 84 extends between the second servo motor 34 and a second end 86 of the cutter frame 24. In this manner, the rotating assembly 84 transfers motion from the second servo motor 34 to the cutter frame 24 to define the second component 38 of the cutting motion 30. The rotating assembly 84 can be defined by a pair of reciprocating linkages 88 or tie rods that rotationally operate a control plate 90 in a reciprocating or oscillating motion that results in the generation of the second component 38. In this manner, the second end 86 of the cutter frame 24 engages the control plate 90 between the pair of tie rods or linkages 88. During operation of the second servo motor 34, a drive plate 92 positioned proximate the second servo motor 34 receives a rotational force from the second servo motor 34 to operate the drive plate 92 in a rotational and reciprocating or oscillating motion. It is contemplated that the drive plate 92 can be attached to the pair of tie rods or linkages 88 at a drive plate 92 of the rotating assembly 84. The pair of linkages 88 then extend from the drive plate 92 to the control plate 90. In this manner, the oscillating, rotational force transferred from the second servo motor 34 to the drive plate 92 is transferred via the pair of linkages 88 to the control plate 90 such that the rotating and reciprocating or oscillation motion of the drive plate 92 is transferred to the control plate 90 and, in turn, transferred to the second end 86 of the cutter frame 24 to operate the cutting edge 26 in unison, or substantial unison, with the control plate 90.

According to the various embodiments, as exemplified in FIGS. 9-17, a pivot shaft 100 can extend from the control plate 90 and the second end of the cutter frame 24, where the pivot shaft 100 is fixed, or substantially fixed, to the control plate 90 and at least one of the first and second ends 82, 86 of the cutter frame 24. The pivot shaft 100, as a result, rotates in unison, in an oscillating or reciprocating manner, with the control plate 90. Accordingly, during operation of the second servo motor 34, similar operation of the drive plate 92 and the control plate 90 through connection of the pair of linkages 88 transfers operational force of the second servo motor 34 to the cutter frame 24. In this manner, operation of the second servo motor 34 is transferred through the rotating assembly 84 to rotate the cutter frame 24, and, in turn, the cutting edge 26 to maintain a distance of the cutting edge 26 with respect to the food extrusion port 20. Accordingly, operation of the second servo motor 34 serves to place the cutting edge 26 proximate the food extrusion port 20 during the cutting path 40 of the cutting motion 30, and operates the cutting edge 26 to be distal from the food extrusion port 20 as the arcuate return path 44 of the cutting motion 30 is being performed.

Referring again to FIGS. 1-13, the first swing arm 80 extends from the first servo motor 32 such that the first swing arm 80 rotates about a first rotational axis 110 of the first servo motor 32 to operate the first swing arm 80 and rotate the cutter frame 24 about the first rotational axis 110. The operation of the first servo motor 32 in rotating the first swing arm 80 provides the primary drive force 150 of the cutter frame 24 and the cutting edge 26 to extend through the cutting region 16 in the forward and/or rearward directions 70, 72, as desired by the user. It is contemplated that the second servo motor 34 can also operate along the first rotational axis 110. As such, the first and second servo motors 32, 34 are positioned co-axially along the first rotational axis 110 and operate concentrically with one another about the first rotational axis 110. The incorporation of the rotating assembly 84 transfers the rotational force of the second servo motor 34 to the second rotational axis 120 that extends along the pivot shaft 100. Accordingly, the second rotational axis 120 can be positioned parallel with but distal from the first rotational axis 110.

According to the various embodiments, as exemplified in FIGS. 9-17, the first servo motor 32 and the first swing arm 80, operating alone, operate to rotate the cutter frame 24 and the cutting edge 26 about the first rotational axis 110. In this manner, the cutting edge 26, operating with only the drive force 150 of the first servo motor 32 would tend to scribe an arcuate path through the cutting region 16, rather than the cutting path 40 of the cutting motion 30. Accordingly, the second servo motor 34, in conjunction with the rotating assembly 84, serves to position the cutting edge 26 at a particular distance relative to the food extrusion port 20 during operation of the cutting path 40. In this manner, the second servo motor 34 and first servo motor 32 operate in conjunction to provide the positioning and the drive force 150, respectively, necessary to move through the cutting region 16. In this manner, the first and second servo motors 32, 34 cooperate to position the cutting edge 26 to accurately move through the cutting region 16 in a linear motion through the extruded edible material 14 and in either a linear or arcuate motion back through the cutting region 16.

Referring again to FIGS. 1-17, while the first servo motor 32 operates the first swing arm 80 and the cutter frame 24 to operate about a first rotational axis 110, the second rotational axis 120 is defined at the pivot shaft 100 and the connection of the pivot shaft 100 with the control plate 90. Accordingly, the second servo motor 34 operates the cutter frame 24 about a second rotational axis 120 that extends through the pivot shaft 100 and the control plate 90. It is contemplated that the second rotational axis 120 is parallel with but separate from the first rotational axis 110. Typically, the second rotational axis 120 will be an axis that extends through distal ends 122 of the first and second swing arms 80, 94, such that as the first and second swing arms 80, 94 operate about the first rotational axis 110, the distal ends 122 of the first and second swing arms 80, 94, which define the second rotational axis 120, also moves about the first rotational axis 110. In this manner, as the first and second swing arms 80, 94 operate about the first rotational axis 110, the second rotational axis 120 also swings about the first rotational axis 110 during operation of the rotating assembly 84 and the cutting mechanism 10. It is contemplated that the pivot shaft 100 can freely rotate or substantially freely rotate within the distal ends 122 of the first and second swing arms 80, 94. In this manner, the operation of the first servo motor 34 can be transferred to the pivot shaft 100 via the rotating assembly 84 independent of the operation of the first servo motor 32.

Referring again to FIGS. 1-13, and in particular, FIGS. 12 and 13, it is contemplated that the second swing arm 94 can be disposed proximate the second servo motor 34 and be positioned in a fixed engagement with the first swing arm 80. According to the various embodiments, a swing shaft 130 can extend between the first and second swing arms 80, 94, where the first rotational axis 110 extends through, or substantially extends through, the swing shaft 130. In this manner, operation of the first swing arm 80 by the first servo motor 32 transfers the rotational force of the first servo motor 32 through the swing shaft 130 and simultaneously operates the second swing arm 94 to move in unison with the first swing arm 80. It is contemplated that the rotating assembly 84 can be at least partially attached to the second swing arm 94 through a rotation interface 132 that allows the pivot shaft 100 to freely rotate through the second swing arm 94. In this manner, the rotation interface 132 can define a rotational engagement between the rotating assembly 84 and the second swing arm 94. Accordingly, the rotating assembly 84 can operate independently of the second swing arm 94 as the rotating assembly 84 moves with the motion of the second swing arm 94 about the first rotational axis 110. As discussed above, the first and second servo motors 32, 34 are positioned to operate concentrically along the first rotational axis 110. The rotational operation of the second servo motor 34 is translated to operate along the second rotational axis 120 through operation of the rotating assembly 84 and the rotation interface 132.

According to various embodiments, as exemplified in FIGS. 9-17, operation of the rotating assembly 84 with the second swing arm 94 serves to simultaneously define the first and second components 36, 38 of the cutting motion 30. Accordingly, operation of the first servo motor 32 rotates the first and second swing arms 80, 94 about the swing shaft 130 and the first rotational axis 110. This motion, in turn, rotates the rotating assembly 84 and engages the second swing arm 94 via the rotation interface 132 such that operation of the first servo motor 32 also operates the rotating assembly 84 about the first rotational axis 110. As discussed above, the pivot shaft 100 and control plate 90 of the rotating assembly 84 define the second rotational axis 120 that, during operation of the first servo motor 32, rotate about the first rotational axis 110. Through this connection of the rotating assembly 84 with the second swing arm 94, these components simultaneously operate to cooperatively define and combine the first and second components 36, 38 to define the cutting motion 30 of the cutting mechanism 10.

It is contemplated that the rotation interface 132 can be defined by the pivot shaft 100 that extends through the distal end 122 of the second swing arm 94 and rotates therein via bearings or other rotationally sliding mechanism. In this manner, the pivot shaft 100 rotates freely, or substantially freely, within the distal end 122 of the second swing arm 94 and fixedly engages the second end 86 of the cutter frame 24. At the same time, the first end 82 of the cutter frame 24 is configured to rotate freely within the distal end 122 of the first swing arm 80. Accordingly, the rotating assembly 84 is allowed to operate independent of, but in conjunction with, the second swing arm 94 to position the cutting edge 26 of the cutter frame 24 in the proper position to define the various aspects and sections of the cutting motion 30. Similarly, a drive end 140 of the second servo motor 34 is configured to be fixedly attached to the drive plate 92 of the rotating assembly 84. It is contemplated that the drive end 140 remains separate from the second swing arm 94 to allow the second swing arm 94 to freely operate. In turn, the rotating assembly 84, while following the motion of the second swing arm 94, is allowed to independently transfer the oscillations of the second servo motor 34 to the cutter frame 24 during operation of the second servo motor 34. This configuration, as discussed above, allows the second rotational axis 120, as defined by the control plate 90 and the pivot shaft 100, to rotate with the first and second swing arms 80, 94 about the first rotational axis 110.

Referring again to FIGS. 1-17, it is contemplated that the cutting mechanism 10 can include the cutter frame 24 that includes the lateral cutting edge 26 and first and second ends 82, 86 of the cutter frame 24. It is also contemplated that the first servo motor 32 can be operably engaged to at least one of the first and second ends 82, 86 of the cutter frame 24. The first servo motor 32 is configured to laterally operate the cutting edge 26 through the cutting region 16 and provide the primary drive force 150 of the cutting edge 26 as it moves through the cutting region 16, either in a forward direction 70 or a rearward direction 72, depending upon the configuration of the cutting motion 30. The second servo motor 34 is operably engaged to the second end 86 of the cutter frame 24, where the second servo motor 34 vertically operates the cutting edge 26 proximate the cutting region 16.

As discussed above, the first and second servo motors 32, 34 cooperate to vertically and laterally operate the cutting edge 26 to define the various components of the cutting motion 30 such as the first and second components 36, 38, as well as other components. It is contemplated that the first servo motor 32 can be attached to both the first and second ends 82, 86 of the cutter frame 24. It is also contemplated that the first servo motor 32 can be attached to the same side of the cutter frame 24 as the rotating assembly 84, which is engaged to the second servo motor 34. The exact positioning of the first and second servo motors 32, 34 can vary depending upon the configuration of the cutting mechanism 10. Typically, because the first servo motor 32 provides the primary drive force 150 of the cutting edge 26 through the cutting region 16, the first servo motor 32 will be at least partially attached to the first and second ends 82, 86 of the cutter frame 24 to provide a stable structure for transferring the drive force 150 at both ends of the cutter frame 24 for driving the cutting edge 26 through the cutting region 16 and through the extruded edible material 14.

According to the various embodiments, it is contemplated that the first and second swing arms 80, 94, as controlled by the first servo motor 32, can operate the cutter frame 24 to define a first reciprocating motion of the cutting edge 26 that corresponds to the first component 36 of the cutting motion 30. As discussed above, this first reciprocating motion can define a portion of the cutting path 40 that extends through the cutting region 16 and one of the arcuate return path 44 or the return cutting path 46 that places the cutting edge 26 back at the start position 60 of the cutting motion 30. The second servo motor 34, simultaneously, operates the rotating assembly 84 to define a second reciprocating motion, corresponding to the second component 38 of the cutting motion 30, where the second reciprocating motion is generally perpendicular to the first reciprocating motion. As discussed above, the second reciprocating motion provided by the rotational force of the second servo motor 34 is transferred to the cutter frame 24 through the drive plate 92, the first and second linkages 88, and the control plate 90. Accordingly, the drive end 140 serves to rotate the cutter frame 24 and rotate the cutting edge 26 to position the cutting edge 26 a particular distance from the one or more food extrusion ports 20.

Referring again to FIGS. 14-17, during performance of the cutting path 40, the second servo motor 34 operates to position the cutting edge 26 in engagement, or substantially in engagement, with the output aperture 28 of the food extrusion port 20. Typically, a similar configuration is utilized during performance of the return cutting path 46, where the cutting edge 26 is, again, in engagement, or substantially in engagement, with the output aperture 28 of the food extrusion port 20. In this manner, each motion of the cutting edge 26 in the forward and rearward directions 70, 72 results in a cutting function of a cutting edge 26 through the extruded edible material 14. Alternatively, the first and second reciprocating motions can cooperate to define the cutting path 40 and the arcuate return path 44, where only one cutting operation is performed during the cutting motion 30, and the arcuate return path 44 of the cutting edge 26 avoids the extruded edible material 14 and places the cutting edge 26 back at the start position 60 to perform another cutting function of the next cycle of the cutting motion 30.

Referring again to FIGS. 1-6 and 14-17, it is contemplated that the cutting assembly 12 can include a control 158 and user interface 160 that are configured to allow the user to manage operation of the first and second servo motors 32, 34, and in turn, operation of the first and second swing arms 80, 94, and the rotating assembly 84. In this manner, the control 158 of the cutting mechanism 10 serves to adjust the cutting motion 30 depending upon the needs of the user, and the configuration of the various extruded edible materials 14 being manufactured. It is contemplated that the control 158 can be used to operate the first and second servo motors 32, 34 to define the cutting path 40 and the return path 42. Through manipulation of the first and second servo motors 32, 34, the velocity of the cutting edge 26, the frequency of each cutting motion 30, the contour of the cutting path 40 and the return path 42 can be manipulated. It is also contemplated that the velocity of the cutting edge 26 can be manipulated to include a fast-cut mode. In the fast-cut mode, the cutting edge 26 can perform the cutting path 40 at a high velocity. The return path 42 can be slowed, or a portion of the return path 42 can be slowed to space the cut material on the conveyor 170. The control 158 can also be used to adjust the rate of extrusion of the edible material 14.

According to the various embodiments, as exemplified in FIGS. 1-17, the extrusion assembly 18 is configured to have one or more food extrusion ports 20. Typically, the various food extrusion ports 20 are selectively configurable to define an array of extrusion ports 20 having at least one row of extrusion ports 20 and at least one column of extrusion ports 20. Accordingly, the various extrusion ports 20 of the extrusion assembly 18 can include a single row of extrusion ports 20 that have the same shape, different shapes, or combinations of shapes for extruding various shapes or forms of the edible material 14 through the cutting region 16. Depending upon the configuration of the extrusion ports 20 and the characteristics of the edible material 14 being extruded, the cutting motion 30 can be modified to efficiently perform the various cutting functions of the cutting mechanism 10.

Referring again to FIGS. 1-17, by way of example, and not limitation, the extrusion assembly 18 can include a single row of extrusion ports 20, where each row can include a plurality of extrusion ports 20. The cutting motion 30 can include the cutting path 40 that extends forward and through the cutting region 16 to separate the extruded edible material 14 into sections that fall onto a conveyor system 170 for movement to the next step in the manufacturing process. The thickness of each section of the extruded edible material 14 can depend upon the speed of extrusion as well as the speed that each cycle of the cutting motion 30 is performed. A faster extrusion of the edible material 14 may result in a faster performance of each cycle of the cutting motion 30. Alternatively, slower extrusion may result in slower operation of each cycle of the cutting motion 30. Faster or slower extrusion can also dictate the amount of movement that the cutting edge 26 experiences to move away from the various food extrusion ports 20 to define the arcuate return path 44 of the cutting motion 30. Faster extrusion may also utilize a greater degree of displacement of the cutting edge 26 during operation of the second servo motor 34 in moving the cutting edge 26 farther away from the food extrusion ports 20. Slower extrusion may utilize a lesser movement of the cutting edge 26 as a result of the operation of the second servo motor 34. This amount of movement away from the food extrusion port 20 through operation of the second servo motor 34 is often referred to as an amount of "drop" 180 that the cutting edge 26 experiences as it moves away from the food extrusion port 20 and then returns to the start position 60 of the cutting edge 26 for operation of the subsequent cycle of the cutting motion 30. As discussed above, where the return path 42 is defined by the return cutting path 46, the cutting blade may experience little or no drop 180 such that the cutting edge 26 can move through the cutting region 16 to cut the extruded edible material 14 in both a forward and rearward direction 70, 72 of the cutting motion 30 (shown schematically in FIG. 14). Accordingly, each cycle of the cutting motion 30 may result in two cuts of the extruded edible material 14. To allow for cutting operations in the forward and rearward directions 70, 72, an extrusion space 190 can be disposed within the cutter frame 24 behind the cutting edge 26. Accordingly, after the completion of the linear cutting path 40, the extrusion of the edible material 14 continues through the extrusion space 190. The return cutting path 46 then moves the cutting edge 26 back through the cutting region 16 to perform the second cutting operation of the cutting motion 30.

According to various alternate embodiments, it is contemplated that the various food extrusion ports 20 can include two or more rows of food extrusion ports 20 where each row includes a plurality of extrusion ports 20 (shown schematically in FIG. 16). In such an embodiment, it is contemplated that the linear cutting path 40 and cutting motion 30 may be in a rearward direction 72 of the cutting edge 26 through the cutting region 16 and the arcuate return path 44 is performed by a drop 180 in an outward motion of the cutting edge 26 to the start position of the cutting edge 26 for performance of a subsequent cycle of the cutting motion 30.

According to the various embodiments, configurations and modifications of the various aspects of the cutting motion 30 can be performed through use of the control 158 of the cutting assembly 12. During downtime of the cutting assembly 12 when the configuration of the food extrusion ports 20 may be modified and/or the nature of the extruded edible material 14 is changed, a single cutting assembly 12 can serve to manufacture any number of extruded edible materials 14 in any number of configurations of the cutting motion 30 based upon changes to the first and second servo motors 32, 34 through operation of the control 158 of the cutting assembly 12.

Referring now to FIGS. 1-17, 19 and 20, according to various embodiments, the rotating assembly 84 that is coupled to the second servo motor 34 can be any one of various configurations. As discussed above, the rotating assembly 84 can include the drive plate 92 that is fixedly attached to a drive portion of the second servo motor 34. The pair of linkages 88 extend from the drive plate 92 to the control plate 90, such that operation of the drive plate 92 results in simultaneous and identical motion of the control plate 90 that operates the pivot shaft 100 and the cutter frame 24 about the second rotational axis 120. Again, the inclusion of the pair of linkages 88 of the rotating assembly 84 allow the second rotational axis 120 to be displaced separate from the first rotational axis 110 such that the operation of the first and second servo motors 32, 34 can be effectively combined to generate the cutting motion 30 of the cutting edge 26. This displacement of the second rotational axis 120 through the implementation of the pair of linkages 88 of the rotating assembly 84 also allows the motion of the cutting edge 26 to be adjustable depending upon the configuration of the extrusion ports 20 and the nature of the extruded edible material 14 being cut.

Figure 18:
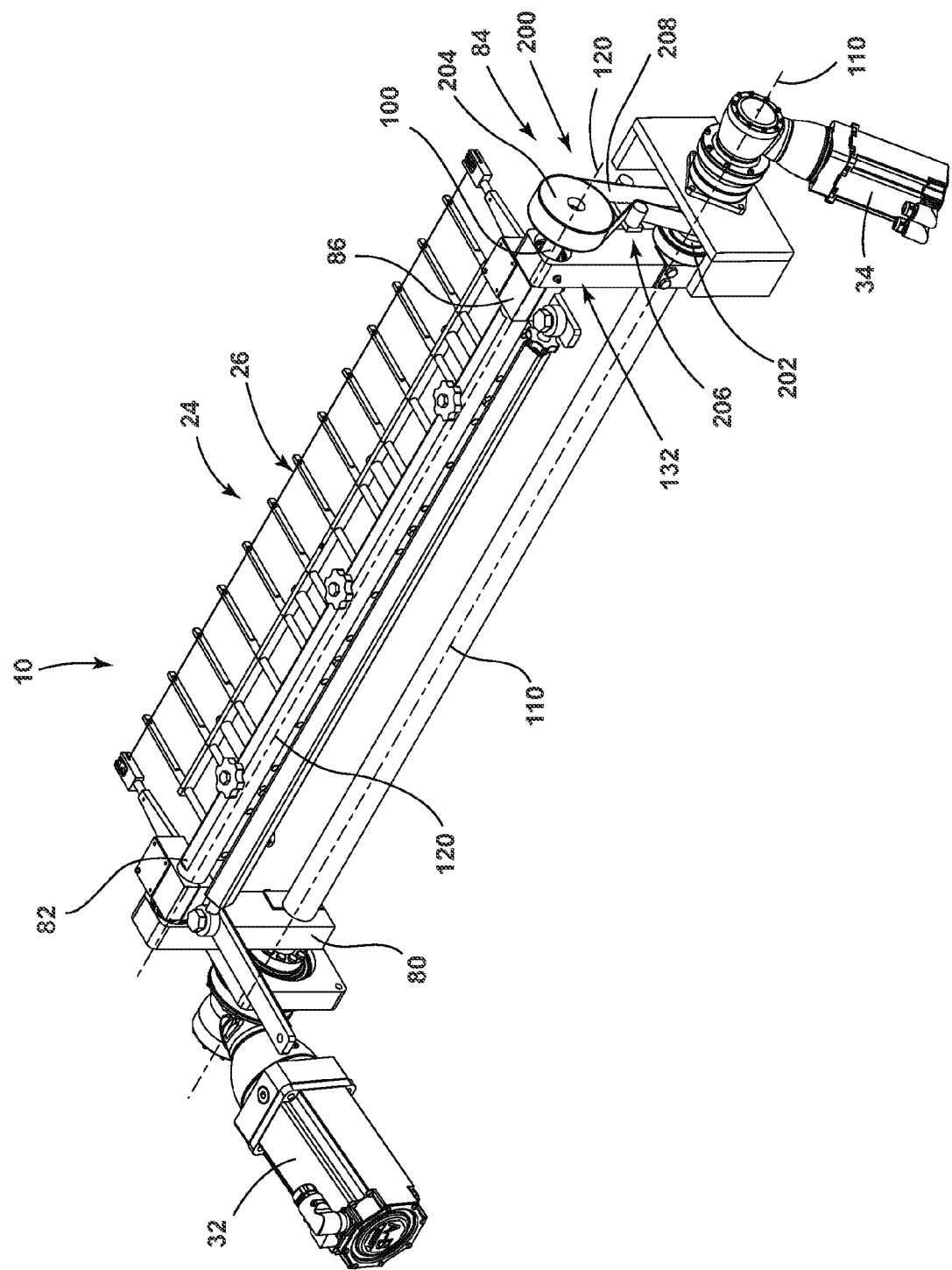
FIG. 18 is a top perspective view of an aspect of the cutting assembly incorporating a belt driven rotating assembly.
Figure 19:
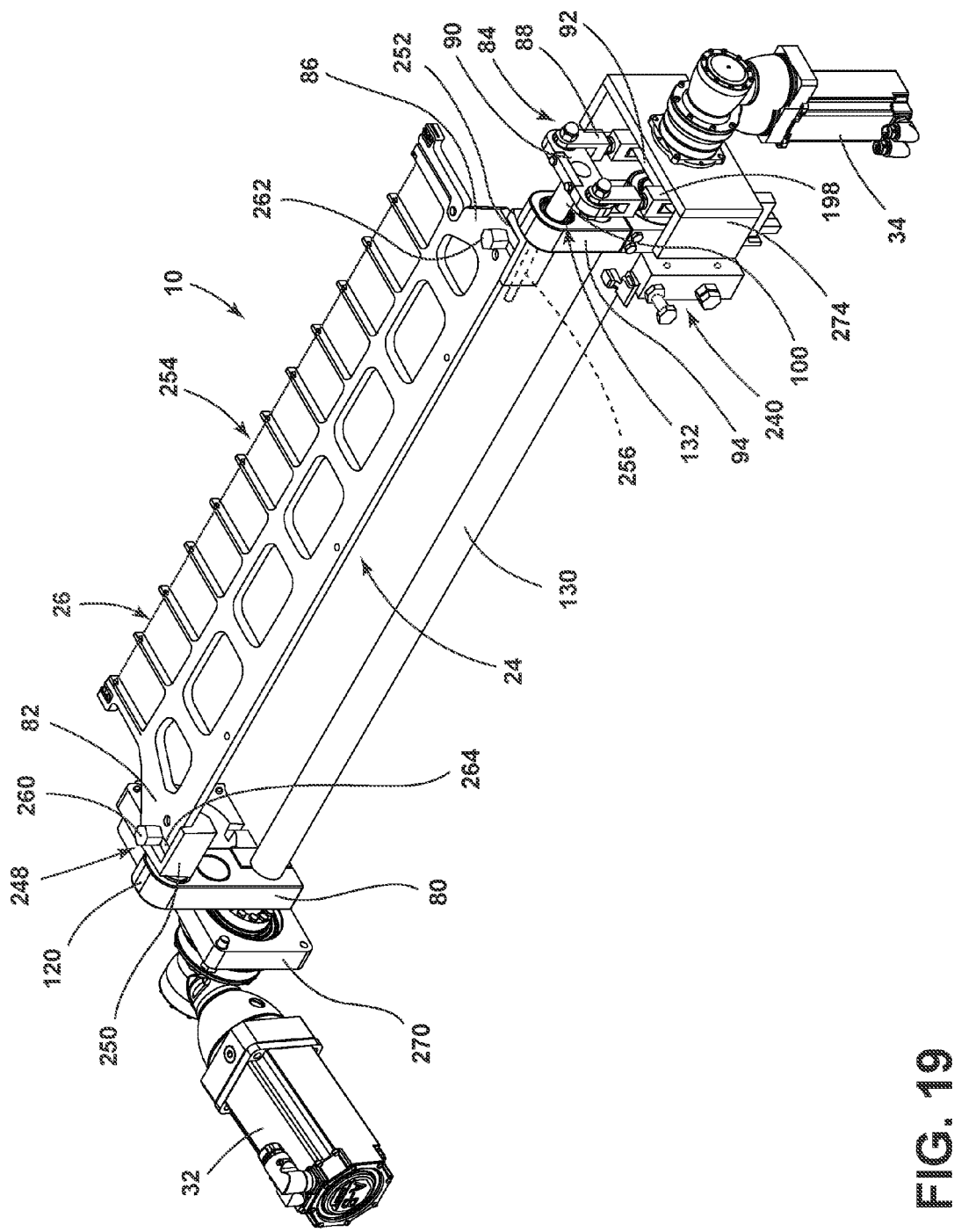
FIG. 19 is a top perspective view of an aspect of the servo-driven cutting mechanism including a quick-release cutter frame configuration with the cutter frame in an operational position.
Figure 20:
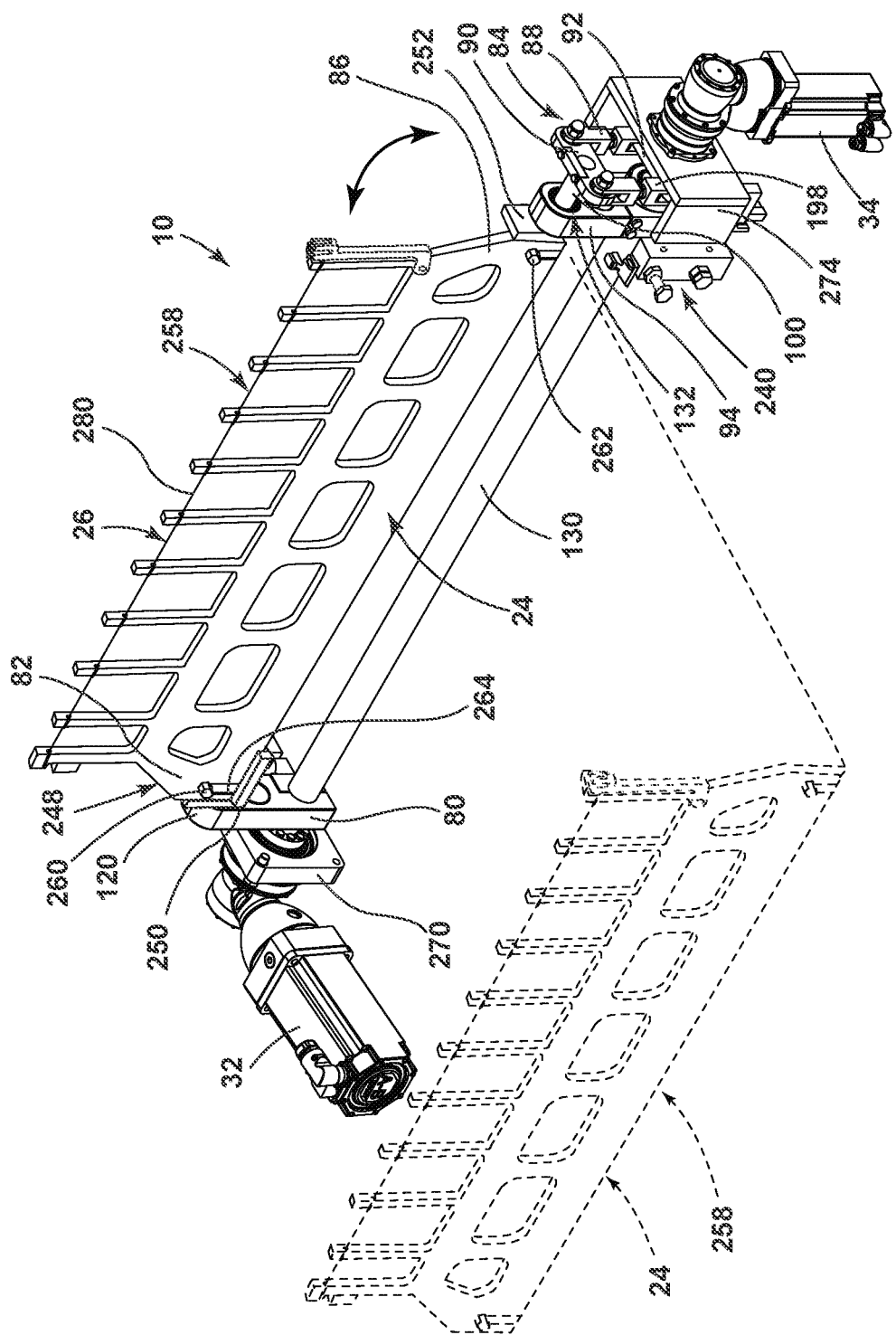
FIG. 20 is a top perspective view of the servo-driven cutting mechanism of FIG. 19 illustrating the cutter frame in the upright maintenance position.

According to various alternate embodiments, as exemplified in FIG. 18, the rotating assembly 84 can also be a belt drive 200 extending between the second servo motor 34 and the second end 86 of the cutter frame 24. It is contemplated that the belt drive 200 of the rotating assembly 84 defines the rotational reciprocating motion of the cutting edge 26 that helps to define the drop 180, or the second reciprocating motion of the cutting motion 30. In such an embodiment, the belt drive 200 can include a first spool 202 that is positioned proximate the drive of the second servo motor 34. A second spool 204 of the belt drive 200 can be positioned proximate the second end 86 of the cutter frame 24 and concentric with the second rotational axis 120. It is contemplated that various alternate rotating assemblies 84 can be used that incorporate linkages, bolts, gears, levers, rods, pistons, combinations thereof and other similar mechanisms capable of transferring oscillating and/or reciprocal movement.

According to the various embodiments, as exemplified in FIGS. 1-17, 19 and 20, the pair of linkages 88 of the rotational assembly 84 can be adjustable to extend and retract the lengths of each of the linkages 88. The adjustment portion 198, such as a threaded extending mechanism, can be used to adjust the positioning of the second rotational axis 120 with respect to the first rotational axis 110. The adjustment portion 198 within each linkage 88 can be used to provide finite adjustment to limit the amount of play or wobble that may exist at the engagement of the control plate 90 and/or the drive plate 92. In this manner, precise calibration of the second component 38 of the cutting motion 30 is possible.

In embodiments utilizing the belt drive 200, the belt drive 200 can include a tensioning mechanism 206 that allows the second spool 204 to be moved toward and away from the first spool 202 to adjust the positioning of the second rotational axis 120, by moving the second spool 204 toward or away from the first spool 202. The tensioning mechanism 206 can serve to maintain a desired tension of the belt 208 in transferring the rotational force of the second servo motor 34, through the first spool 202 and to the second spool 204 via the belt 208. It is also contemplated that the belt 208 and first and second spools 202, 204 can include a toothed engagement to prevent slippage of the bolt 208.

Referring again to FIGS. 1-20, it is contemplated that the cutting mechanism 10 of the cutting assembly 12 is configured to be removable from the cutting assembly 12 for maintenance, replacement, cleaning, and other maintenance related functions. In this manner, the first and second swing arms 80, 94 can be attached to the swing shaft 130 via a clamping mechanism 220 positioned at the proximal ends 222 of the first and second swing arms 80, 94. The clamping mechanism 220 can be attached to the swing shaft 130 via various fasteners 224 that attach a clamping portion 226 about the swing shaft 130 to secure the first and second swing arms 80, 94 to the swing shaft 130 and form the first and second swing arms 80, 94 and the swing shaft 130 into a unitary assembly that is rotated by the first servo motor 32. The rotating assembly 84 can also be coupled to the drive end 140 extending from the second servo motor 34 such that the first and second swing arms 80, 94 and the rotating assembly 84 can be easily removed from the first and second servo motors 32, 34 for maintenance and replacement.

Referring again to FIGS. 1-20, it is contemplated that various aspects of the cutting mechanism 10 can include one or more stop mechanisms 240 that serve to limit the rotational movement of the first and second swing arms 80, 94 about the first rotational axis 110. It is contemplated that these stop mechanisms 240 can serve to protect components of the cutting mechanism 10 from damage. The stop mechanisms 240 serve to define a point at which the first and second swing arms 80, 94 reverse direction by defining an outer limit of rotation. Alternatively, it is contemplated that the stop mechanisms 240 are for preventing over rotation of the first and/or second swing arms 80, 94. In such an embodiment, it is contemplated that the first and second swing arms 80, 94 may only engage the stop mechanisms 240 when an over rotation of the first and second swing arms 80, 94 is experienced, such that the stop mechanisms 240 are used to limit the rotation of the first and second swing arms 80, 94. The stop mechanisms 240 can also be used for calibration of the cutting mechanism 10 through positional calibration, torque-based calibration, or other similar calibration methods.

According to the various embodiments, stop mechanisms 240 can also be used to prevent over rotation of the rotating assembly 84, where stop mechanisms 240 can be used to engage one or both of the drive plate 92 and the control plate 90, and typically the drive plate 92. It is contemplated that the stop mechanisms 240 can be positioned on either side of the drive plate 92 such that as the drive plate 92 experiences the rotational reciprocating motion transferred by the second servo motor 34, the various stop mechanisms 240 serve to limit the rotation of the drive plate 92 to a predetermined range. The stop mechanisms 240 can serve to engage the drive plate 92 only when an over rotation of the drive plate 92 is experienced. Alternatively, it is contemplated that the drive plate 92 can at least partially engage the stop mechanisms 240 such that the various calibration operations can be performed.

According to the various embodiments, where the stop mechanisms 240 of the first and second swing arms 80, 94 and/or the stop mechanisms 240 of the drive plate 92 at least partially engage the various stops, it is contemplated that a portion of the stop mechanisms 240 can be encased or covered in at least some form of elastomeric material, such as rubber, plastic, polymer, or other at least partially deformable material that is configured to receive and deflect when engaging either the swing arms or the drive plate 92.

Referring again to FIGS. 19 and 20, it is contemplated that the engagement with the cutter frame 24 and first and second swing arms 80, 94 can include a one-piece wire frame attached to a quick release assembly 248. In such an embodiment, it is contemplated that the first and second swing arms 80, 94 can include first and second attachment receptacles 250, 252 that selectively secure the first and second ends 82, 86 of the cutter frame 24 to the first and second swing arms 80, 94, respectively. It is contemplated that the first and second attachment receptacles 250, 252 are selectively operable to rotate the cutter frame 24 between an operational position 254 that is substantially perpendicular to the first and second swing arms 80, 94. Through operation of a locking mechanism 256, the cutter frame 24 can be rotated through operation of the first and second attachment receptacles 250, 252 to a maintenance position 258, where the cutter frame 24 is positioned substantially parallel with the first and second swing arms 80, 94. In this position, a user can easily access first and second fixing mechanisms 260, 262 that are selectively secured at the first and second attachment receptacles 250, 252 to secure the first and second ends 82, 86 of the cutter frame 24 to the first and second attachment receptacles 250, 252.

Through operation of the first and second fixing mechanisms 260, 262 of the first and second attachment receptacles 250, 252, the first and second fixing mechanisms 260, 262 can be loosened such that the cutter frame 24 can be slid out from the first and second attachment receptacles 250, 252 via attachment grooves 264 defined within the cutter frame 24. The cutter frame 24, can be configured to be substantially light such that a single individual can lift, remove, and replace a cutter frame 24 within the first and second attachment receptacles 250, 252. It is further contemplated that the first and second fixing mechanisms 260, 262 of the first and second attachment receptacles 250, 252 can be thumb screws, wing nuts, or other similar fasteners 224 that can be operated by hand and without the use of tools. Where greater securing force is necessary, it may be contemplated that a simple tool, such a wrench, may be necessary to fully tighten the fasteners 224 of the first and second attachment receptacles 250, 252. The first and second attachment receptacles 250, 252 and the locking mechanism 256 are further configured such that the cutter frame 24 can be operated between the operational position 254 and the maintenance position 258 by a single individual without the assistance of another individual.

This operation of the attachment receptacles and the cutter frame 24 between the maintenance and operational positions 258, 254 greatly reduces the cost of maintenance, repair and retooling of the cutting apparatus during operation. The use of the first and second attachment receptacles 250, 252 also provides for easy modification of the cutting motion 30 to account for a different configuration of the food extrusion ports 20 for a different extruded edible material 14 being run through the cutting assembly 12. It is contemplated that the quick release assembly 248 can be used in conjunction with the various embodiments of the cutting mechanism 10 and/or the rotating assembly 84 described herein.

According to the various embodiments, the positioning of the rotating assembly 84 in close engagement with the second swing arm 94 provides a compact engagement that greatly reduces the number of components needed for the cutting mechanism 10, as when compared to conventional assemblies for cutting various food products. The reduction in the number of components according to the various aspects of the cutting mechanism 10 described herein provides fewer moving parts and minimal points to clean and maintain within the cutting assembly 12. The compact configuration of the various aspects of the cutting mechanism 10 described herein also include fewer wear points and points of adjustment when compared to conventional mechanisms for cutting various food products.

According to the various embodiments, as exemplified in FIGS. 1-20, it is contemplated that the various aspects of the cutting mechanism 10 can be retrofit to after-market cutting apparatuses that may have contained a conventional mechanism for cutting various food products. Such a retrofit can be accomplished through the engagement of a first servo housing 270 with a primary assembly housing 272 that engages the first servo motor 32 to the primary assembly housing 272. Similarly, a second servo housing 274 can be attached to the primary assembly housing 272 for engaging the second servo motor 34 to the primary assembly housing 272. It is contemplated that minimal punctures, openings, or other apertures are needed to retrofit an after-market cutting assembly 12 to install the various aspects of the cutting mechanisms 10 described herein to accomplish the retrofitting operation. This retrofit is made more efficient, due to the fact that the primary points of the aspects of the cutting mechanism 10 extend through the primary assembly housing 272 are the engagement between the first servo motor 32 and the first swing arm 80 and the swing shaft 130 with the opposing side of the primary assembly housing 272. Accordingly, the swing shaft 130 passes through opposing sides of the primary assembly housing 272. Accordingly, the various aspects of the cutting mechanism 10 include a minimal footprint. In this manner, the various aspects of the cutting mechanism 10 can be conveniently retrofit into after-market cutting assemblies, such that entire purchase of a new cutting assembly 12 may not be necessary in order to achieve the advantages of the various aspects of the cutting mechanism 10 as described herein.

According to the various embodiments as exemplified in FIGS. 9-20, it is contemplated that the cutting edge 26 of the cutter frame 24 can be defined by a single wire 280 that extends along an outer edge of the cutter frame 24. In this manner, the wire 280 can define a multi-directional cutting edge 26 as the gate 24 moves in both the forward and rearward directions 70, 72, such that the wire 280 can operate the cutting functions of the cutting path 40 as well as, where programmed, the return cutting path 46. Additionally, the wire 280 can be used for performing the cutting path 40 in either the forward and rearward directions 70, 72, as those variations are described herein. It is contemplated that various alternate cutting edges 26 are contemplated, where such cutting edges 26 can include, but are not limited to, wires, serrated elements, knife-type edges, cutting bands, cutting blades, reciprocating edges, vibrating edges, lasers, water jets, combinations thereof, and other similar implements utilized in cutting various materials.

According to the various embodiments, various aspects of the cutting mechanism 10 can include various detection mechanisms that are configured to be in communication with the cutting edge 26. According to such embodiments, where the cutting edge 26 becomes slack, breaks, or experiences some other form of deflection or damage, a detection system in communication with the control 158 can alert the user to the existence of a maintenance issue with respect to the cutting edge 26. In such an embodiment, the cutting mechanism 10 can automatically shut down until such time as an issue is resolved through repair or replacement of the cutting edge 26. Alternatively, where the maintenance issue does not result in a loss of quality of the cutting edge 26, it is contemplated that the user is alerted to the issue and repair or replacement of the cutting edge 26 is recommended to the user by the control 158 of the cutting assembly 12.

According to the various embodiments, due to the minimal footprint of the various aspects of the cutting mechanism 10, lesser guarding, in the form of shields, and other paneling is needed as compared to conventional mechanisms for cutting various food items. Accordingly, greater access is provided to the components of the various aspects of the cutting mechanism 10, and fewer resources and materials are needed when manufacturing various aspects of the cutting assembly 12. These improvements in the various aspects of the cutting mechanism 10 serve to lower the cost of manufacture, retrofit, and maintenance of the various aspects of the cutting appliance and the cutting mechanism 10, as described herein.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cutting mechanism for cutting an extruded food product, the cutting mechanism comprising:
    a cutter frame having a lateral cutting edge, the cutter frame having first and second ends;
    a first servo motor operably engaged to at least one of the first and second ends of the cutter frame, wherein the first servo motor laterally operates the cutting edge through a cutting region; and
    a second servo motor operably engaged to the second end of the cutter frame, wherein the second servo motor vertically operates the cutting edge proximate the cutting region, wherein the first and second servo motors are positioned to concentrically operate along a first rotational axis.

2. The cutting mechanism of claim 1, wherein the first and second servo motors cooperate to define a cutting path of the cutting edge through the cutting region in a first direction, and an arcuate return path through the cutting region in a second direction that is opposite of the first direction.

3. The cutting mechanism of claim 1, wherein a first swing arm extends from the first servo motor to the first end of the cutter frame, wherein the first swing arm defines a first reciprocating motion of the cutting edge.

4. The cutting mechanism of claim 3, wherein a rotating assembly extends between the second servo motor and the second end of the cutter frame, wherein the rotating assembly defines a second reciprocating motion of the cutting edge, wherein the second reciprocating motion is generally perpendicular to the first reciprocating motion, wherein the first reciprocating motion is defined about the first rotational axis and the second reciprocating motion is defined about a second rotational axis, wherein the second rotational axis is parallel with and distal from the first rotational axis.

5. The cutting mechanism of claim 4, further comprising:
    a second swing arm disposed proximate the second servo motor and in a fixed engagement with the first swing arm; and
    a rotation interface defined between the rotating assembly and the second swing arm, wherein the rotating assembly operates in unison with a motion of the second swing arm and simultaneously defines the second reciprocating motion.

6. The cutting mechanism of claim 5, wherein the rotating assembly is defined by a pair of linkages that rotationally operate a control plate, wherein the second end of the cutter frame engages the control plate between the pair of linkages.

7. The cutting mechanism of claim 5, wherein the rotating assembly includes a belt drive extending between the second servo motor and the second end of the cutter frame, wherein the belt drive of the rotating assembly defines a rotational reciprocating motion of the cutting edge.

8. The cutting mechanism of claim 5, wherein each of the first and second swing arms include first and second attachment receptacles that selectively secure the first and second ends of the cutter frame to the first and second swing arms, respectively, and wherein the first and second attachment receptacles are selectively operable to rotate the cutter frame between an operational position and a maintenance position, the maintenance position being substantially perpendicular to the operational position.

9. A cutting mechanism for a food extruding assembly, the cutting mechanism comprising:
    a cutter frame having a lateral cutting edge and positioned proximate an extrusion port, wherein the lateral cutting edge is positioned relative to the extrusion port to extend through a cutting region proximate the extrusion port in a cutting motion; and first and second servo motors operably coupled to the cutter frame, wherein the first servo motor operates the cutting edge to define a first component of the cutting motion, and wherein the second servo motor operates the cutting edge to define a second component of the cutting motion, the first component being a rotation of the cutting edge about a first rotational axis and the second component being a rotation of the cutting edge about a second rotational axis, wherein the second rotational axis moves in conjunction with the first component, and wherein the first and second servo motors cooperatively combine the first and second components to define a cutting path of the cutting edge through a cutting region and a return path through the cutting region, the cutting region being positioned proximate the extrusion port, wherein the first servo motor is positioned proximate a first of the cutter frame, and wherein the second servo motor is positioned proximate a second end of the cutter frame, and wherein the first and second servo motors are positioned to concentrically operate along the first rotational axis.

10. The cutting mechanism of claim 9, wherein the cutter frame is selectively coupled at first and second ends to first and second swing arms, respectively, wherein the first and second swing arms are fixedly connected via a swing shaft that at least partially defines the first rotational axis, and wherein the first and second ends of the cutter frame freely rotate within the first and second swing arms.

11. The cutting mechanism of claim 10, wherein the second servo motor is attached to a rotating assembly that is coupled to the second swing arm, wherein the rotating assembly defines the second rotational axis that extends through the second swing arm proximate the second end of the cutter frame, wherein the second rotational axis is distal from and parallel with the first rotational axis.

* * * * *